US010295866B2

(12) United States Patent
Chang et al.

(10) Patent No.: US 10,295,866 B2
(45) Date of Patent: May 21, 2019

(54) LIQUID CRYSTAL DISPLAY DEVICE

(71) Applicant: SAMSUNG DISPLAY CO., LTD., Yongin-si, Gyeonggi-do (KR)

(72) Inventors: Hak Sun Chang, Yongin-si (KR); Cheol Shin, Hwaseong-si (KR); Young Goo Song, Asan-si (KR); Seung Jun Yu, Cheonan-si (KR); Se Hyun Lee, Seoul (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 144 days.

(21) Appl. No.: 15/410,420

(22) Filed: Jan. 19, 2017

(65) Prior Publication Data
US 2017/0357129 A1    Dec. 14, 2017

(30) Foreign Application Priority Data
Jun. 13, 2016    (KR) .................. 10-2016-0073151

(51) Int. Cl.
G02F 1/1343    (2006.01)
G02F 1/1337    (2006.01)
G02F 1/1362    (2006.01)

(52) U.S. Cl.
CPC .. *G02F 1/133753* (2013.01); *G02F 1/134309* (2013.01); *G02F 1/133707* (2013.01); *G02F 2001/133761* (2013.01); *G02F 2001/136218* (2013.01); *G02F 2201/121* (2013.01); *G02F 2201/123* (2013.01)

(58) Field of Classification Search
None
See application file for complete search history.

(56) References Cited

U.S. PATENT DOCUMENTS

| | | |
|---|---|---|
| 2015/0042917 A1 | 2/2015 | Kim et al. |
| 2015/0378221 A1 | 12/2015 | Tae et al. |
| 2016/0013250 A1 | 1/2016 | Kim et al. |
| 2016/0075948 A1 | 3/2016 | Ogawa et al. |

FOREIGN PATENT DOCUMENTS

KR    10-2015-0008758 A    1/2015

OTHER PUBLICATIONS

Extended European Search Report dated Oct. 23, 2017 for EP 17175118.3; Hak Sun Chang, et al.

*Primary Examiner* — Richard H Kim
(74) *Attorney, Agent, or Firm* — Lee & Morse, P.C.

(57) ABSTRACT

A liquid crystal display device includes a first substrate; a first pixel electrode disposed on the first substrate and including a first body portion, a first sub-edge portion on a first side of the first body portion, and a second sub-edge portion, which on a second side of the first body portion; and a shield electrode on the same layer as the first pixel electrode a shield electrode on the same layer as the first pixel electrode and extending from a first side of the first sub-edge portion in a first direction. The first body portion includes a first stem portion, a second stem portion that intersects the first stem portion, and a plurality of branch portions extending from at least one of the first stem portion and the second stem portion. The first sub-edge portion is spaced apart from the branch portions and has a bent portion.

27 Claims, 17 Drawing Sheets

LIQUID CRYSTAL DISPLAY DEVICE

CROSS-REFERENCE TO RELATED APPLICATION

Korean Patent Application No. 10-2016-0073151, filed on Jun. 13, 2016, in the Korean Intellectual Property Office, and entitled: "Liquid Crystal Display Device," is incorporated by reference herein in its entirety.

BACKGROUND

1. Field

The present disclosure relates to a liquid crystal display (LCD) device.

2. Description of the Related Art

The importance of display devices has steadily grown with recent developments in multimedia technology. As a result, a variety of display devices such as a liquid crystal display (LCD) device, an organic light-emitting diode (OLED) display device, and the like have been developed and widespread.

The LCD device, which is one of the most widely-used flat panel displays, includes two substrates having field-generating electrodes, e.g., pixel electrodes, a common electrode, and so forth, and a liquid crystal layer between the two substrates. The LCD device forms an electric field in the liquid crystal layer by applying voltages to the field-generating electrodes so as to determine the orientation of liquid crystal molecules in the liquid crystal layer, and displays an image by controlling the polarization of light incident thereupon using the electric field.

A vertical alignment (VA)-mode LCD device, which is a type of LCD device in which liquid crystal molecules are aligned such that their long axes are perpendicular to upper and lower panels in the absence of an electric field has been highlighted because of its high contrast ratio and wide reference viewing angle. Here, the reference viewing angle means a viewing angle having a contrast ratio of 1:10 or a marginal angle for luminance inversion between gray levels.

In order to make the side visibility of the LCD device as similar as possible to the front visibility of the LCD device, each pixel electrode may be divided into two sub-pixel electrodes, and different voltages may be applied to the two sub-pixel electrodes so as to make transmittance vary.

SUMMARY

According to an exemplary embodiment of the present disclosure, an LCD device includes: a first substrate; a first pixel electrode on the first substrate and including a first body portion, a first sub-edge portion on a first side of the first body portion, a second sub-edge portion on a second side of the first body portion; and a shield electrode on the same layer as the first pixel electrode and including a first sub-shield electrode on a first side of the first pixel electrode, and a second sub-shield electrode on a second side of the first pixel electrode. The first body portion may include a first stem portion extending in a first direction, a second stem portion extending in a second direction that intersects the first direction, and a plurality of branch portions, which extend from at least one of the first stem portion and the second stem portion. The first sub-edge portion may have a first region and a second region with different shortest distances to the first sub-shield electrode. The second sub-edge portion may have a third region and a fourth region with different shortest distances to the second sub-shield electrode.

The first sub-edge portion and the second sub-edge portion may not directly contact the branch portions.

The first sub-edge portion may directly contact a first side of the second stein portion, and the second sub-edge portion may directly contact a second side of the second stem portion.

The first sub-edge portion may be symmetrical with the second sub-edge portion with respect to the first stem portion.

A shortest distance to the first sub-shield electrode in the second region may be longer than a shortest distance to the first sub-shield electrode in the first region, and a shortest distance to the second sub-shield electrode in the fourth region may be longer than a shortest distance to the second sub-shield electrode in the second region.

The first sub-edge portion may have a fifth region in which a shortest distance to the first sub-shield electrode is shorter than the shortest distance to the first sub-shield electrode in the second region, and the second sub-edge portion may have a sixth region in which a shortest distance to the second sub-shield electrode is shorter than the shortest distance to the first sub-shield electrode in the fourth region.

The second region may be between the first region and the fifth region with respect to the first direction, and the fourth region may be disposed between the third region and the sixth region with respect to the first direction.

The LCD device may further include: a second substrate facing the first substrate, a common electrode on the second substrate and overlapping the first pixel electrode; and a liquid crystal layer including a plurality of liquid crystal molecules between the first substrate and the second substrate, wherein: the liquid crystal molecules include first liquid crystal molecules in an area overlapping the first region, and second liquid crystal molecules in an area overlapping with the second region; and the first liquid crystal molecules are pretilted to have a different azimuthal angle from the second liquid crystal molecules.

The branch portions may include first sub-branch portions between the second region and the first stem portion with respect to the second direction, and second sub-branch portions between the fourth region and the first stem portion with respect to the second direction. Ends of the first sub-branch portions may be connected to one another and the ends of the second sub-branch portions may be connected to one another.

The LCD device may further include a second pixel electrode on the first substrate and neighboring the first pixel electrode, wherein: the second pixel electrode includes a second body portion having a third stem portion extending in the first direction, and a third sub-edge portion between a first side of the second body portion and the second sub-shield electrode; and the third sub-edge portion has a seventh region and an eighth region having different shortest distances to the second sub-shield electrode.

A shortest distance to the second sub-shield electrode in the seventh region may be longer than a shortest distance to the second sub-shield electrode in the eighth region.

According to another exemplary embodiment of the present disclosure, an LCD device includes: a first substrate; a first pixel electrode on the first substrate and including a first body portion and a first sub-edge portion on a first side of the first body portion; and a shield electrode on the same layer as the first pixel electrode and extending from a first side of the first sub-edge portion in a first direction, wherein: the first body portion includes a first stem portion, which extends in the first direction, a second stem portion, which extends in a second direction that intersects the first direction, and a plurality of branch portions, which extend from at least one of the first stem portion and the second stem portion; and the first sub-edge portion is spaced apart from the branch portions and has a bent portion.

The first sub-edge portion may have a first region and a second region having different shortest distances to the shield electrode.

A shortest distance to the shield electrode in the first region may be shorter than a shortest distance to the shield electrode in the second region, the first sub-edge portion may further have a third region in which the shortest distance to the shield electrode is shorter than the shortest distance to the shield electrode in the second region, and the second region may be between the first region and the third region with respect to the first direction.

The LCD device may further include: a second substrate facing the first substrate; and a liquid crystal layer including a plurality of liquid crystal molecules between the first substrate and the second substrate, wherein: the liquid crystal molecules include first liquid crystal molecules in an area overlapping the first region and second liquid crystal molecules in an area overlapping the second region; and the first liquid crystal molecules are pretilted to have a different azimuthal angle from the second liquid crystal molecules.

The first sub-edge portion may have a third region and a fourth region having different shortest distances to the first stem portion.

The LCD device may further include a second sub-edge portion on a second side of the first body portion, wherein the second sub-edge portion is spaced apart from the branch portions and has a bent portion.

The first sub-edge portion may be symmetrical with the second sub-edge portion with respect to the first stem portion.

The LCD device may further include a second pixel electrode on the first substrate and neighboring the first pixel electrode. The second pixel electrode may include a second body portion having a third stem portion extending in the first direction, and a third sub-edge portion between the second body portion and the shield electrode; the third sub-edge portion having a bent portion.

The third sub-edge portion may have the same shape as the first sub-edge portion.

The first sub-edge portion may include a first region extending the first direction and second region extending in the first direction spaced apart from the first region along the second direction, and the bent portion connects the first and second regions.

The first sub-edge portion may include a third region extending in the first direction spaced apart from the second region in the second direction and another bent portion that connects the second and third regions.

The first region and the third region may be aligned in the second direction.

An area of the first and third regions may equal an area of the second region.

An area of the first and third regions is greater than an area of the second region.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
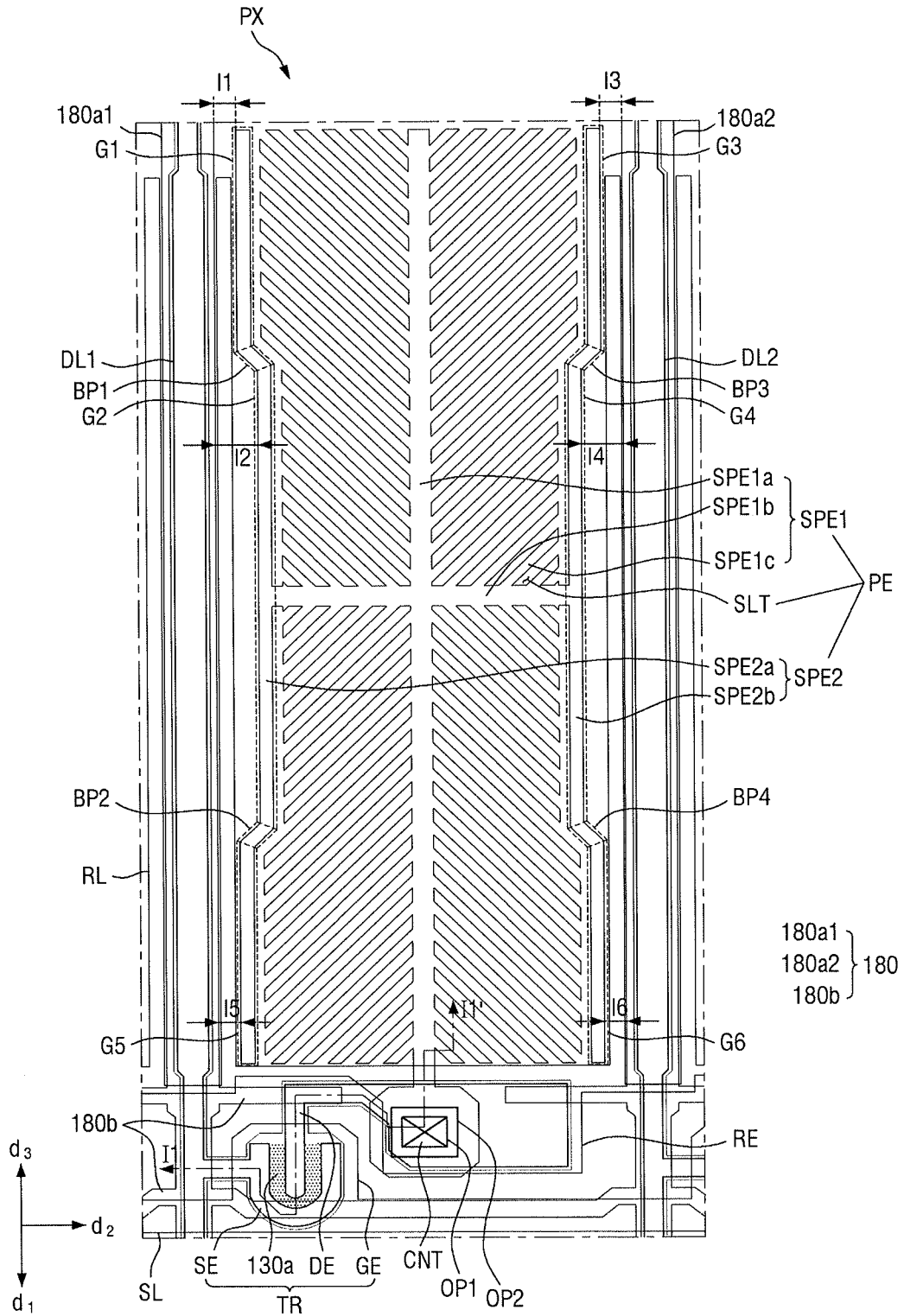
FIG. 1 illustrates a layout view of a pixel unit of a liquid crystal display (LCD) device according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different provides and should not be construed as being limited to the embodiments set forth herein. Rather, these embodiments are provided so that this disclosure will be thorough and complete and will fully convey the concept of the present disclosure to those skilled in the art, and the present disclosure will only be defined by the appended claims. Like reference numerals refer to like elements throughout the specification.

The term "on" that is used to designate that an element is on another element or located on a different layer or a layer includes both a case where an element is located directly on another element or a layer and a case where an element is located on another element via another layer or still another element.

Spatially relative terms, such as "below", "beneath", "lower", "above", "on", "upper", and the like, may be used herein for ease of description and/or illustration to describe one element or feature's relationship to another element(s) or feature(s) as illustrated in various drawings. It should be understood, however, that the spatially relative terms are intended to encompass different orientations of the device in use or operation in addition to the orientation depicted in the various drawings. For example, if the device in the various drawings is turned over, elements described as "below" or "beneath" other elements or features would then be oriented "above" the other elements or features. Thus, a relative spatial term such as "below" can encompass both an orientation of above and below. The device may be otherwise oriented and the spatially relative descriptors used herein are to be interpreted accordingly.

The terms "first", "second", "third", etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein. The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

In the entire description of the present disclosure, the same drawing reference numerals are used for the same elements throughout the accompanying drawings.

Exemplary embodiments of the present disclosure will hereinafter be described with reference to the accompanying drawings.

FIG. 1 is a layout view of a pixel unit of a liquid crystal display (LCD) device according to an exemplary embodiment of the present disclosure. Referring to FIG. 1, a pixel unit PX may be electrically connected to a first data line DL1 and a scan line SL. The first data line DL1 may extend in a first direction $d_1$. The scan line SL may extend in a second direction $d_2$, which is different from the first direction $d_1$. The first direction $d_1$ may perpendicularly intersect the second direction $d_2$. As illustrated in FIG. 1, the first direction $d_1$ may be a column direction, and the second direction $d_2$ may be a row direction.

The pixel unit PX may include a switching device TR and a pixel electrode PE. In an exemplary embodiment, the switching device TR may be a three-terminal device such as a thin-film transistor (TFT). A control electrode of the switching device TR may be connected to the scan line SL, and a first electrode of the switching device TR may be connected to the first data line DL1. A second electrode of the switching device TR may be connected to the pixel electrode PE. In an exemplary embodiment, the first electrode of the switching device TR may be a source electrode SE, and the second electrode of the switching device TR may be a drain electrode DE.

The switching device TR may be turned on by a scan signal provided from the scan line SL and may provide a data signal provided from the first data line DL1 to the pixel electrode PE. More specifically, the switching device TR may perform a switching operation according to the scan signal provided from the scan line SL via the gate electrode GE. As a result, the data signal provided from the first data line DL1 via the source electrode SE may be provided to the pixel electrode via the drain electrode DE and a contact hole CNT.

The pixel electrode PE may include a body portion SPE1 and an edge portion SPE2.

The body portion SPE1 may include a first stem portion SPE1$a$, which extends in the first direction $d_1$, and a second stem portion SPE1$b$, which extends in the second direction $d_2$. The first stem portion SPE1$a$ may intersect the second stem portion SPE1$b$. In an exemplary embodiment, the first stem portion SPE1$a$ may intersect the second stem portion SPE1$b$ at the center of the pixel electrode PE. Accordingly, the first stem portion SPE1$a$ and the second stem portion SPE1$b$ may form a cross shape. The pixel electrode PE may have four domains defined by the first stem portion SPE1$a$ and the second stem portion SPE1$b$, assuming an intersection of the first and second stem portions has a coordinate (0,0), e.g., an upper left hand portion (+$d_1$, −$d_2$), an upper right hand portion (+$d_1$, +$d_2$), a lower left hand portion (−$d_1$, −$d_2$), and a lower right hand portion (−$d_1$, +$d_2$).

The body portion SPE1 may further include a plurality of branch portions SPE1$c$. The branch portions SPE1$c$ may extend from at least one of the first stem portion SPE1$a$ and the second stem portion SPE1$b$. The branch portions SPE1$c$ may extend in different directions in the four domains. In particular, the branch portions SPE1$c$ may extend at an angle to first and second directions from the first stem portion SPE1$a$ and the second stem portion SPE1, e.g. upwards and to the left in the upper left hand portion, upwards and to the right in the upper right hand portion, downwards and to the left in the lower left hand portion, and downwards and to the right in the lower right hand portion. The pixel electrode PE may further include slits SLT, which are defined among the branch portions SPE1$c$, e.g., between adjacent branch portions SPE1$c$.

The edge portion SPE2 may be disposed on at least one of a first side and a second side of the body portion SPE1. e.g., where the first and second sides are spaced apart along the second direction $d_2$. The pixel electrode PE will hereinafter be described, taking an example in which the edge portion SPE2 is disposed on both the first side and the second side of the body portion SPE1, as shown in FIG. 1.

The edge portion SPE2 may include a first sub-edge portion SPE2$a$ on the first side of the body portion SPE1 and a second sub-edge portion SPE2 on the second side of the body portion SPE1. The first sub-edge portion SPE2$a$ and the second sub-edge portion SPE2$b$ may extend substantially in the first direction $d_1$. The edge portion SPE2 may control an electric field formed between a common electrode (CE of FIG. 2) and each of the first side and the second side of the body portion SPE1.

The first sub-edge portion SPE2$a$ may be connected, e.g., directly connected, to a first side of the second stem portion SPE1$b$. The second sub-edge portion SPE2$b$ may be directly connected to a second side of the second stem portion SPE1$b$. The first sub-edge portion SPE2$a$ may not be directly connected to the branch portions SPE1$c$. That is, the first sub-edge portion SPE2$a$ may be spaced apart from the branch portions SPE1$c$ by a predetermined distance along the second direction $d_2$.

The second sub-edge portion SPE2$b$ may be connected, e.g., directly connected, to a second side of the second stem portion SPE1$b$. The second sub-edge portion SPE2$b$ may not be directly connected to the branch portions SPE1$c$. That is, the second sub-edge portion SPE2$b$ may be spaced apart from the branch portions SPE1$c$ by a predetermined distance along the second direction $d_2$.

The expression "directly connected", as used herein, encompasses not only a case in which elements are electrically connected, but also a case in which elements are physically connected. Alternatively, the first sub-edge portion SPE2*a* and the second sub-edge portion SPES2*b* may be directly connected to at least one of the branch portions SPE1*c*.

A shield electrode 180 may include a first sub-shield electrode 180*a*1 and a second sub-shield electrode 180*a*2, which extend in the first direction $d_1$. The shield electrode 180 may further include a third sub-shield electrode 180*b*, which extends in the second direction $d_2$. In an exemplary embodiment, the first sub-shield electrode 180*a*1, the second sub-shield electrode 180*a*2, and the third sub-shield electrode 180*b* may be directly connected to one another. In an exemplary embodiment, the shield electrode 180 may be disposed on the same layer as the pixel electrode PE. The shield electrode 180 will be described later in detail with reference to FIGS. 2 and 5.

The first sub-edge portion SPE2*a* may be disposed between the first sub-shield electrode 180*a*1 and the body portion SPE1. The second sub-edge portion SPE2*b* may be disposed between the second sub-shield electrode 180*a*2 and the body portion SPE1.

The first sub-edge portion SPE2*a* may have a first region G1 and a second region G2, which differ from each other in terms of the shortest distance to the first sub-shield electrode 180*a*1. Referring to FIG. 1, the shortest distance to the first sub-shield electrode 180*a*1 in the first region G1, i.e., a distance l1, may be shorter than the shortest distance to the first sub-shield electrode 180*a*1 in the second region G2, i.e., a distance l2. The term "shortest distance", as used herein, means the shortest straight-line distance between two elements in a horizontal direction, e.g., the second direction $d_2$.

For this reason, the first sub-edge portion SPE2*a* may further have a first bent portion BP1 between the first region G1 and the second region G2, e.g., physically connects the first region G1 and the second region G2. In particular, the first bent portion BP1 may be at an angle to the first direction $d_1$ along which the first and second regions extend.

The first sub-edge portion SPE2*a* may further have a fifth region G5. The shortest distance to the first sub-shield electrode 180*a*1 in the fifth region G5, i.e., a distance l5, may be shorter than the shortest distance to the first sub-shield electrode 180*a*1 in the second region G2, i.e., the distance l2. For this reason, the first sub-edge portion SPES2*a* may further have a second bent portion BP2 between the second region G2 and the fifth region G5, e.g., physically connects the second region G2 and the fifth region G5. In particular, the first bent portion BP1 may be at an angle to the first direction $d_1$ along which the second and fifth regions extend. In an exemplary embodiment, the distance l5 may be the same as the distance l2.

The second region G2 of the first sub-edge portion SPE2*a* may be between the first region G1 and the fifth region G5 with respect to the first direction $d_1$.

The second sub-edge portion SPE2*b* may have a third region G3 and a fourth region G4, which differ from each other in terms of the shortest distance to the second sub-shield electrode 180*a*2. Referring to FIG. 1, the shortest distance to the second sub-shield electrode 180*a*2 in the third region G3, i.e., a distance l3, may be shorter than the shortest distance to the second sub-shield electrode 180*a*2 in the fourth region G4, i.e., a distance l4. For this reason, the second sub-edge portion SPE2*b* may further have a third bent portion BP3 between the third region G3 and the fourth region G4, e.g., may physically connect the third region G3 and the fourth region G4. In particular, the third bent portion BP3 may be at an angle to the first direction $d_1$ along which the third and fourth regions extend.

The second sub-edge portion SPE2*b* may further have a sixth region G6. The shortest distance to the second sub-shield electrode 180*a*2 in the sixth region G6, i.e., a distance l6, may be shorter than the shortest distance to the second sub-shield electrode 180*a*2 in the fourth region G4, i.e., the distance l4. For this reason, the second sub-edge portion SPES2*b* may further have a fourth bent portion BP4 between the fourth region G4 and the sixth region G6, e.g., the fourth bent portion BP4 may physically connect the fourth region G4 and the sixth region G6. In particular, the fourth bent portion BP4 may be at an angle to the first direction $d_1$ along which the fourth and sixth regions extend. In an exemplary embodiment, the distance l6 may be the same as the distance l4.

The fourth region G4 of the second sub-edge portion SPE2*b* may be disposed between the third region G3 and the sixth region G6 with respect to the first direction $d_1$. That is, in an exemplary embodiment, the first sub-edge portion SPE2*a* and the second sub-edge portion SPE2*b* may be symmetrical with respect to the first stem portion SPE1*a*, e.g., may be mirror images of each other with respect to the first stem portion SPE1*a*. The shape of the first bent portion BP1, the second bent portion BP2, the third bent portion BP3, and the fourth bent portion BP4 is not necessarily limited to that illustrated in FIG. 1.

A storage line RL may be capacitively coupled to at least one of the pixel electrode PE and the shield electrode 180. In an exemplary embodiment, the storage line RL may be formed to surround the pixel electrode PE and the shield electrode 180. For this reason, the pixel unit PX may further include a storage capacitor, which is capacitively coupled to the pixel electrode PE or between the storage line RL and the shield electrode 180.

Figure 2:
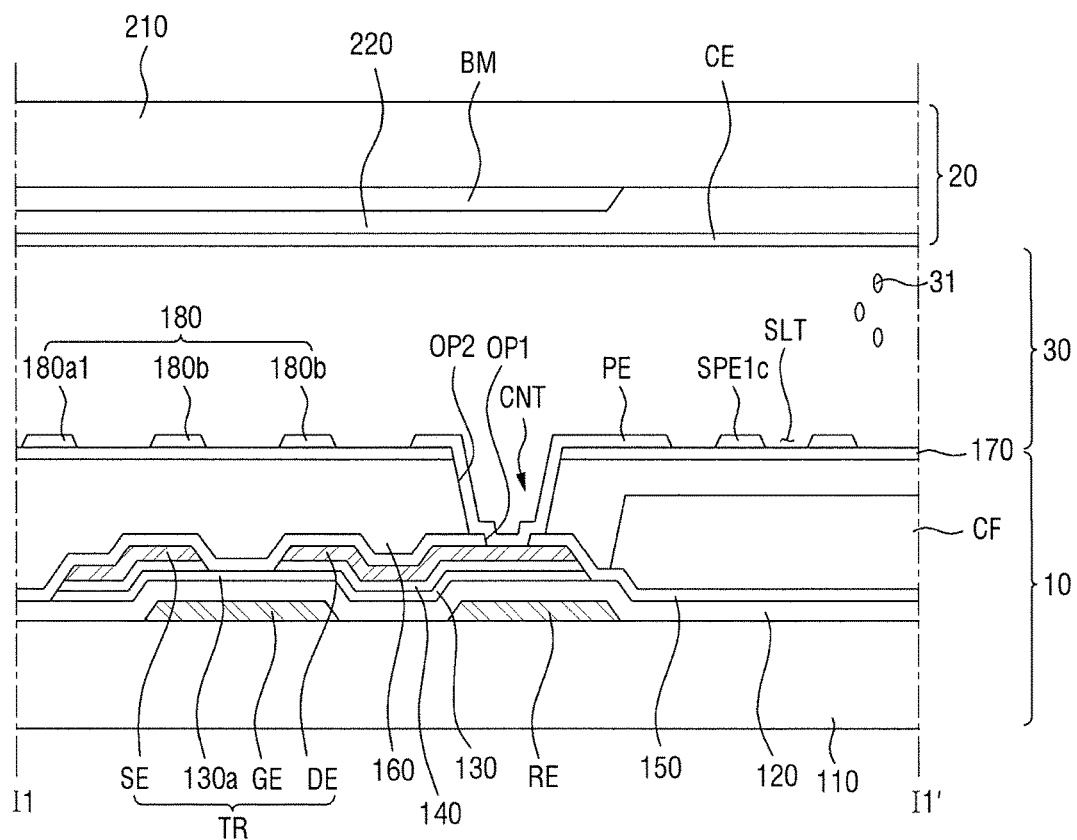
FIG. 2 illustrates a cross-sectional view taken along line I-I' of FIG. 1.
Figure 3:
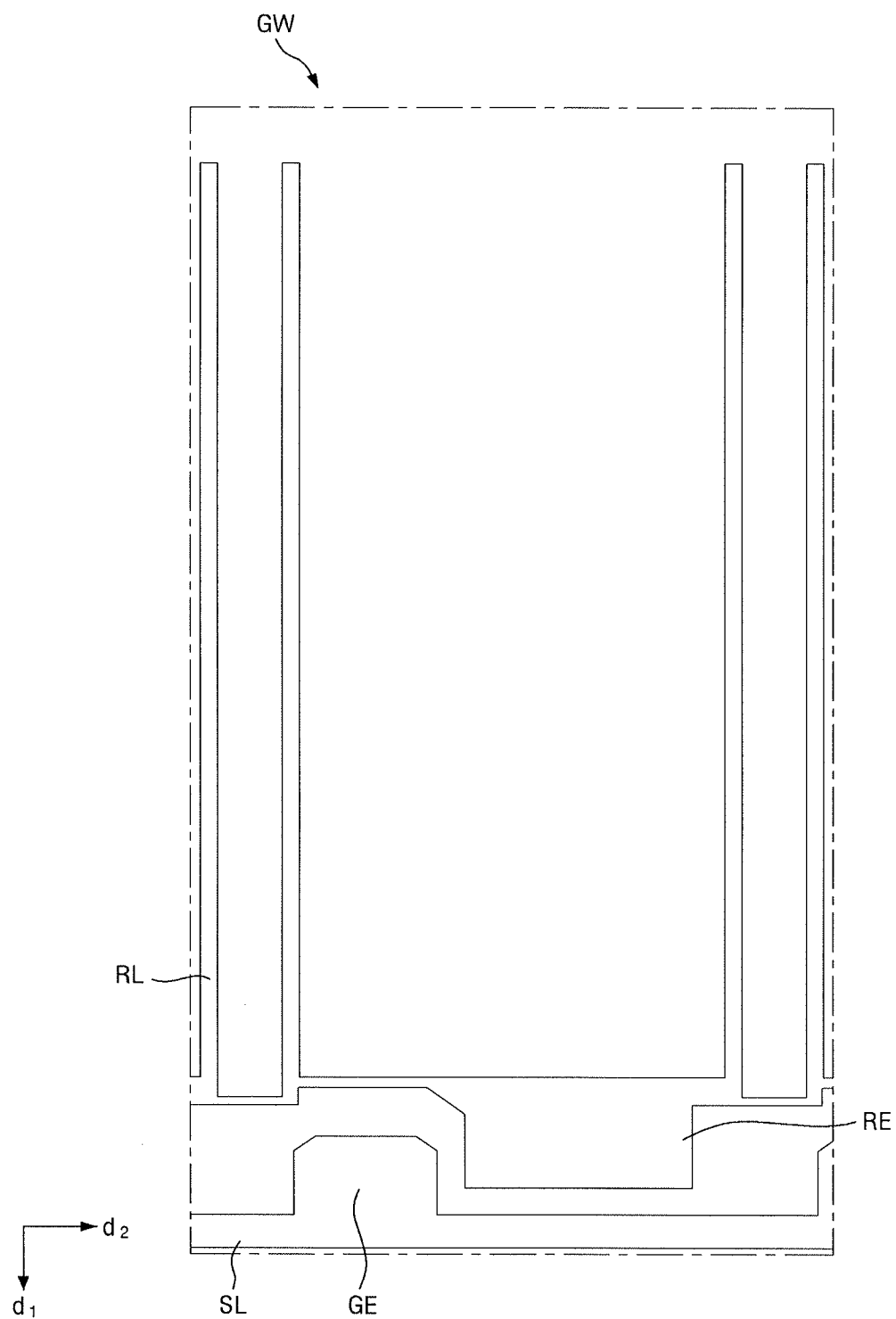
FIG. 3 illustrates a plan view of a gate conductor of FIG. 1.
Figure 4:
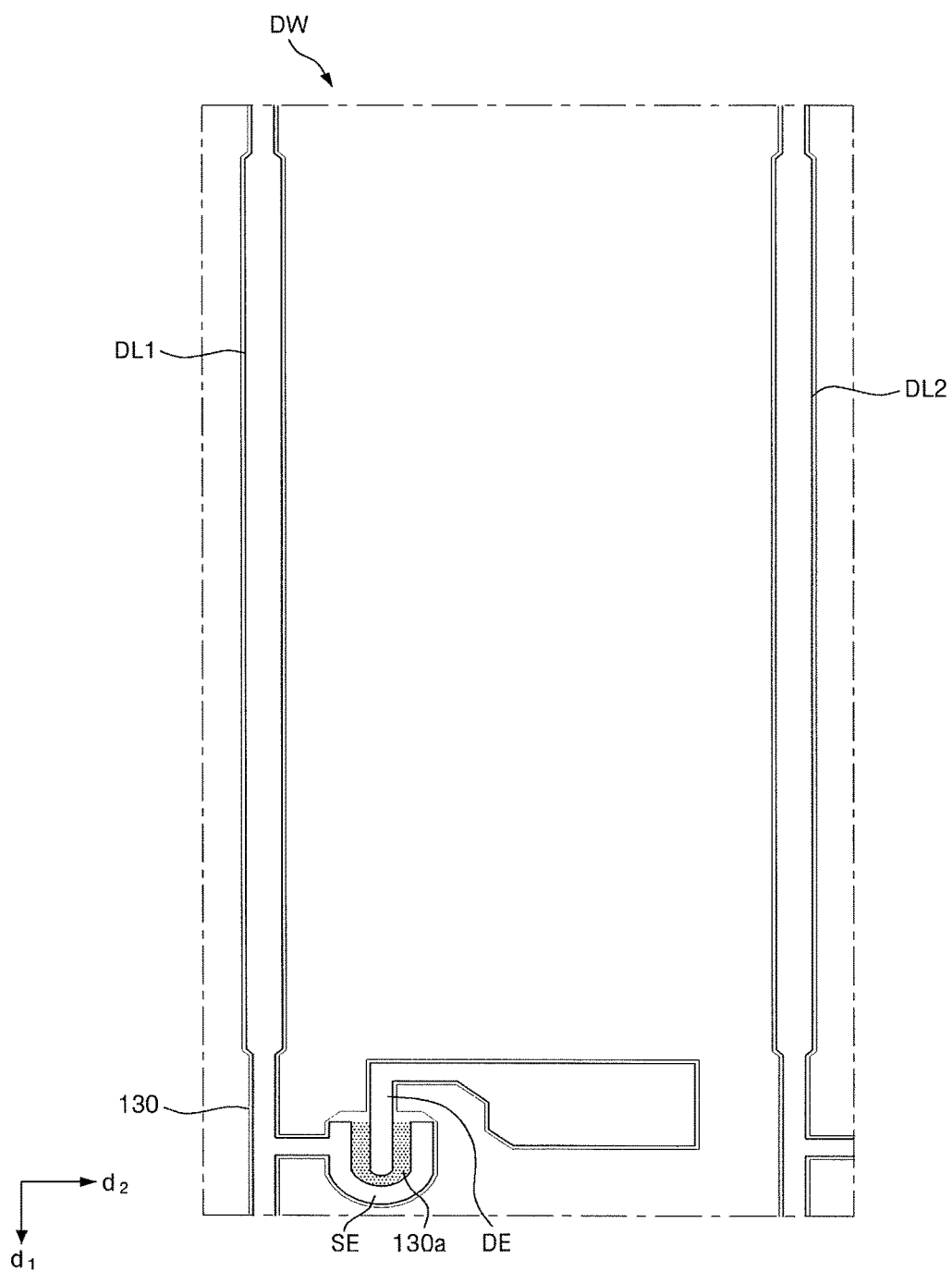
FIG. 4 illustrates a plan view of a data conductor of FIG. 1.
Figure 5:
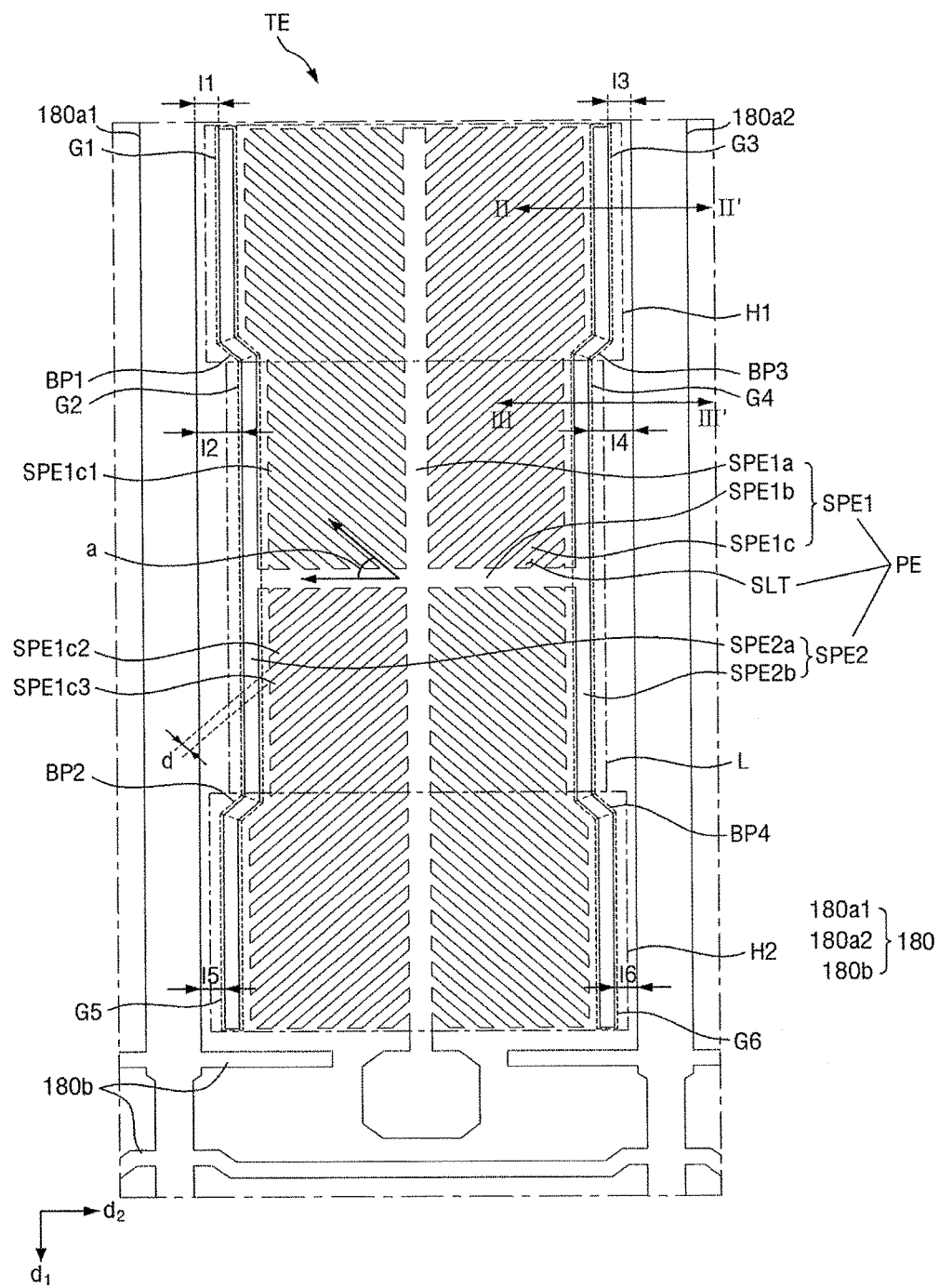
FIG. 5 illustrates a plan view of a transparent conductor of FIG. 1.

FIG. 2 is a cross-sectional view taken along line I-I' of FIG. 1. FIG. 3 is a plan view illustrating a gate conductor of FIG. 1. FIG. 4 is a plan view illustrating a data conductor of FIG. 1. FIG. 5 is a plan view illustrating a transparent conductor of FIG. 1.

Referring to FIGS. 1 through 5, a lower display substrate 10 may be disposed to face an upper display substrate 20. A liquid crystal layer 30 may be interposed between the lower display substrate 10 and the upper display substrate 20 and may include a plurality of liquid crystal molecules 31. In an exemplary embodiment, the lower display substrate 10 may be bonded to the upper display substrate 20 through sealing.

The lower display substrate 10 will hereinafter be described. In an exemplary embodiment, a lower substrate 110 may be a transparent insulating substrate. Examples of the transparent insulating substrate may include a glass substrate, a quartz substrate, and a transparent resin substrate.

A gate conductor GW may be disposed on the lower substrate 110. The gate conductor GW may include the scan line SL and the gate electrode GE. The scan line SL may extend in the second direction $d_2$ over the lower substrate 110.

The gate electrode GE may be disposed on the lower substrate 110 and may be directly connected to the scan line SL. In an exemplary embodiment, the gate electrode GE may be formed to project from the scan line SL. The gate electrode GE may be an element of the switching device TR that will be described later.

The gate conductor GW may further include the storage line RL and a storage electrode RE. In an exemplary embodiment, referring to FIGS. 1 and 3, the storage line RL and the storage electrode RE may be disposed on the same layer as the gate electrode GE and the scan line SL. The storage line RL may be formed to surround the pixel electrode PE. The storage electrode RE may extend from the storage line RL. In an exemplary embodiment, the storage electrode RE may be formed to project from the storage line RL. The storage electrode RE may be capacitively coupled to at least one of the pixel electrode PE and the shield electrode 180.

The gate conductor GW may be formed as a single layer, a double layer, or a triple layer including at least one, two, or three selected from among aluminum (Al), copper (Cu), molybdenum (Mo), chromium (Cr), titanium (Ti), tungsten (W), molybdenum tungsten (MoW), molybdenum titanium (MoTi), and Cu/MoTi. The gate conductor GW, i.e., the scan line SL, the gate electrode GE, the storage line RL, and the storage electrode RE, may be formed at the same time by the same mask process.

A gate insulating layer 120 may be disposed on the gate conductor GW. In an exemplary embodiment, the gate insulating layer 120 may be formed of silicon nitride (SiNx) or silicon oxide (SiOx). The gate insulating layer 120 may have a multilayer structure consisting of at least two insulating layers having different physical properties.

A data conductor DW may be disposed on the gate insulating layer 120. The data conductor DW may include a semiconductor layer 130, the first data line DL1, the second data line DL2, the source electrode SE, and the drain electrode DE.

The semiconductor layer 130 may be disposed on the gate insulating layer 120. The semiconductor layer 130 may include a semiconductor pattern 130*a*, which forms a channel region of the switching device TR. The semiconductor layer 130 may comprise an oxide semiconductor. The semiconductor layer 130 may be formed of one selected from among indium gallium zinc oxide (IGZO). ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$. Alternatively, the semiconductor layer 130 may be formed of amorphous silicon or polycrystalline silicon.

The data conductor DW may further include an ohmic contact layer 140. The ohmic contact layer 140 may be disposed on the semiconductor layer 130. The ohmic contact layer 140 may be formed of silicide or n+ hydrogenated amorphous silicon doped with a high concentration of n-type impurities. In a case in which the ohmic contact layer 140 is formed of an oxide semiconductor, the semiconductor layer 130 may not be provided.

The first data line DL1, the second data line DL2, the source electrode SE, and the drain electrode DE may be disposed on the gate insulating layer 120 and the ohmic contact layer 140. The first data line DL1 and the second data line DL2 may extend in the first direction $d_1$ over the lower substrate 110. The first data line DL1 may be disposed adjacent to the second data line DL2.

The source electrode SE may be branched off from the first data line DL1 and may at least partially overlap with the gate electrode GE in a direction perpendicular to the lower substrate 110. The drain electrode DE may overlap, e.g., partially overlap, the gate electrode GE in the direction perpendicular to the lower substrate 110, e.g., a third direction $d_3$ and may be spaced apart from the source electrode SE by a predetermined distance along the second direction $d_2$. FIG. 4 illustrates an example in which the source electrode SE is in a U shape surrounding the drain electrode DE, but the present disclosure is not limited to this example.

The source electrode SE and the drain electrode DE may form the switching device TR together with the semiconductor pattern 130*a* and the gate electrode GE. The source electrode SE of the switching device TR may be directly connected to the first data line DL1. The drain electrode DE of the switching device TR may be electrically connected to the pixel electrode PE via the contact hole CNT. The channel region of the switching device TR may be formed between the source electrode SE and the drain electrode DE according to a scan signal provided from the scan line SL via the gate electrode GE. In an exemplary embodiment, the drain electrode DE may overlap with the storage electrode RE in the direction perpendicular to the lower substrate 110.

The data conductor DW may be formed as a single layer, a double layer, or a triple layer comprising at least one, two, or three selected from among Al, Cu, Mo, Cr, Ti, W, MoW, MoTi, and Cu/MoTi, but the present disclosure is not limited thereto. That is, alternatively, the data conductor DW may be formed of various metals or conductors other than those set forth herein.

In an exemplary embodiment, referring to FIG. 4, the elements of the data conductor DW may be formed at the same time by the same mask process. In this exemplary embodiment, the first data line DL1, the second data line DL2, the source electrode SE, and the drain electrode DE may have substantially the same shape as the entire semiconductor layer 130 except for the semiconductor pattern 130*a*.

A first passivation layer 150 may be disposed on the first data line DL1, the second data line DL2, the source electrode SE, and the drain electrode DE. The first passivation layer 150 may include a first opening OP1, which exposes part of the drain electrode DE. In an exemplary embodiment, the first passivation layer 150 may be formed of an inorganic insulating material such as silicon nitride or silicon oxide. The first passivation layer 150 may prevent a pigment of an organic insulating layer 160 that will be described later from being introduced into the semiconductor pattern 130*a*.

A color filter CF may be disposed on the first passivation layer 150. The color filter CF may display one of primary colors such as red, green, and blue, but the present disclosure is not limited thereto. The color filter CF may be formed of a material that displays different colors in adjacent pixels. The color filter CF may be disposed on the lower substrate 110, as illustrated in FIG. 2. Alternatively, the color filter CF may be disposed on an upper substrate 210.

The organic insulating layer 160 may be disposed on the first passivation layer 150. The organic insulating layer 160 may overlap the first opening OP1 in the direction perpendicular to the lower substrate 110 and may include a second opening OP2, which exposes part of the drain electrode DE. The organic insulating layer 160 may have excellent planarization properties and may comprise an organic material having photosensitivity. The organic insulating layer 160 may not be provided. The organic insulating layer 160 may include the second opening OP2, which overlaps with the first opening OP1 that exposes part of the drain electrode DE.

A second passivation layer 170 may be disposed on the organic insulating layer 160. In an exemplary embodiment, the second passivation layer 170 may be formed of an inorganic insulating material such as silicon nitride or silicon oxide. The second passivation layer 170 may not be provided.

A transparent conductor TE may be disposed on the second passivation layer 170. The transparent conductor TE may be formed of a transparent conductive material such as indium tin oxide (ITO) or indium zinc oxide (IZO) or a reflective metal such as Al, silver (Ag), Cr, or an alloy thereof. The transparent conductor TE may include the pixel electrode PE and the shield electrode 180. In an exemplary embodiment, the pixel electrode PE and the shield electrode 180 may be formed at the same time by the same mask process. The pixel electrode PE may be disposed on the same layer as the shield electrode 180. The pixel electrode PE will be described later in detail with reference to FIG. 5.

The shield electrode 180 may be disposed on the second passivation layer 170. The shield electrode 180 may be electrically insulated from the pixel electrode PE.

The shield electrode 180 may include the first sub-shield electrode 180a1, which overlaps with the first data line DL1 in the direction perpendicular to the lower substrate 110, e.g., the third direction $d_3$. The shield electrode 180 may further include the second sub-shield electrode 180a2, which overlaps the second data line DL2 in the direction perpendicular to the lower substrate 110, e.g., the third direction $d_3$. The shield electrode 180 may further include the third sub-shield electrode 180b, which overlaps the scan line SL in the direction perpendicular to the lower substrate 110, e.g., the third direction $d_3$. Accordingly, the first sub-shield electrode 180a1 and the second sub-shield electrode 180a2 may extend substantially in the first direction $d_1$, and the third sub-shield electrode 180b may extend substantially in the second direction $d_2$.

Thus, the first sub-shield electrode 180a1 may prevent light leakage that may be caused by a coupling between the first data line DL1 and the pixel electrode PE. Also, the second sub-shield electrode 180a2 may prevent light leakage that may be caused by a coupling between the second data line DL2 and the pixel electrode PE. Also, the third sub-shield electrode 180b may prevent light leakage that may be caused by a coupling between the scan line SL and the pixel electrode PE.

Although not illustrated in FIGS. 1 through 5, a first alignment layer may be disposed on the pixel electrode PE and the shield electrode 180. The first alignment layer may be formed of polyimide.

The upper display substrate 20 will hereinafter be described. The upper substrate 210 may face the lower substrate 110. The upper substrate 210 may be formed of transparent glass or plastic. In an exemplary embodiment, the upper substrate 210 may be formed of the same material as the lower substrate 110.

A black matrix BM, which blocks the transmission of light in a region other than a pixel region, may be disposed on the upper substrate 210. In an exemplary embodiment, the black matrix BM may be formed of an organic material or a metal material including Cr.

A planarization layer 220 may be disposed on the upper substrate 210 and the black matrix BM. The planarization layer 220 may be formed of an insulating material and may not be provided.

A common electrode CE may be disposed on the planarization layer 220. The common electrode CE may be overlap the pixel electrode PE in the direction perpendicular to the lower substrate 110, e.g., the third direction $d_3$. In an exemplary embodiment, the common electrode CE may be in a planar shape. In an exemplary embodiment, the common electrode CE may be formed of a transparent conductive material such as ITO or IZO or a reflective metal such as Al, Ag, Cr, or alloy thereof.

Although not illustrated in FIGS. 1 through 5, a second alignment layer may be formed on the common electrode CE. The second alignment layer may be formed of polyimide.

The liquid crystal layer 30 will hereinafter be described. The liquid crystal layer 30 may include the liquid crystal molecules 31, which have dielectric anisotropy and refractive anisotropy. In an exemplary embodiment, the liquid crystal molecules 31 may be aligned in the direction perpendicular to the lower substrate 110, e.g., the third direction $d_3$ in the absence of an electric field. In an exemplary embodiment, in response to an electric field being formed between the lower substrate 110 and the upper substrate 210, the liquid crystal molecules 31 may rotate or may be tilted in a particular direction, thereby changing the polarization of light.

Figure 6:
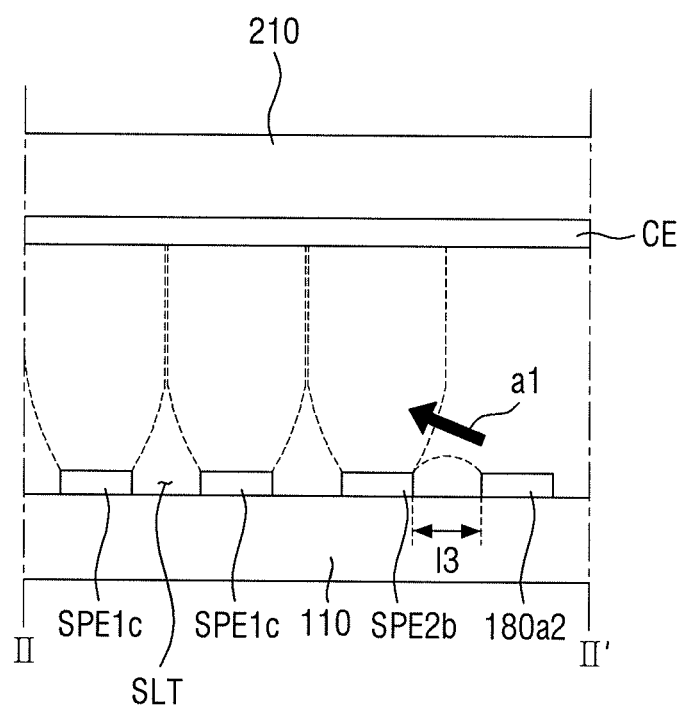
FIG. 6 illustrates a cross-sectional view of a fringe field in a first high area of FIG. 5.
Figure 7:
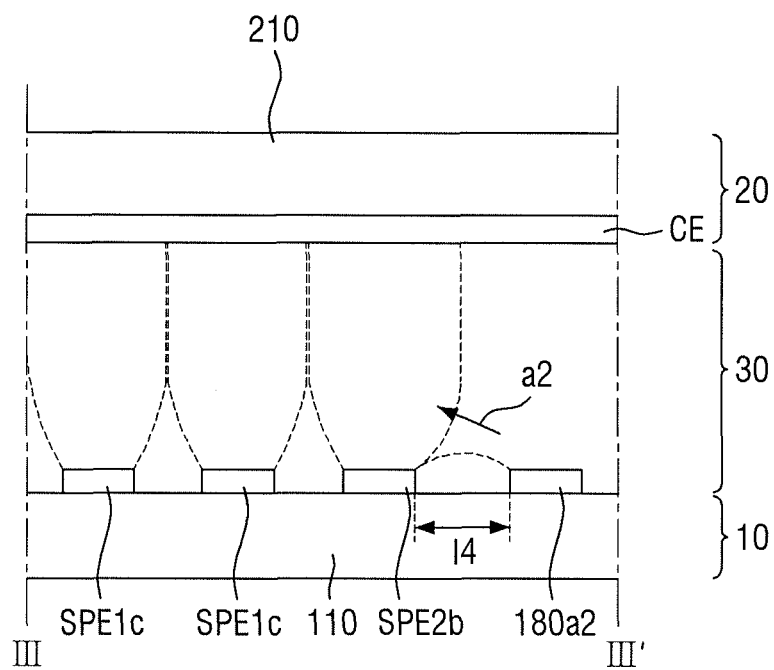
FIG. 7 illustrates a cross-sectional view of a fringe field in a low region of FIG. 5.

FIG. 6 is a cross-sectional view illustrating a fringe field in a first high region, e.g., an upper right hand region adjacent to the third region G3, of FIG. 5. FIG. 7 is a cross-sectional view illustrating a fringe field in a low region, e.g., an upper right hand region adjacent to the fourth region G4, of FIG. 5. For convenience, the LCD device according to the exemplary embodiment of FIG. 1 will hereinafter be described, focusing mainly on the pixel electrode PE, the shield electrode 180, and the common electrode CE.

The pixel electrode PE, the shield electrode 180, and the relationship between the pixel electrode PE and the shield electrode 180 will hereinafter be described with reference to FIGS. 5 through 7, omitting descriptions of elements that have already been described above with reference to FIG. 1.

The pixel electrode PE may be divided into four domains by the first stem portion SPE1a, the second stem portion SPE1b, the first sub-edge portion SPE2a, and the second sub-edge portion SPE2b. The branch portions SPE1c may extend in different directions in different domains of the pixel electrode PE. For example, as illustrated in FIG. 5, a first sub-branch portion SPE1c1, among other branch portions SPE1c, may extend from the second stem portion SPE1b in an upper left direction to have a predetermined angle. An angle a between the first sub-branch portion SPE1c1 and the second stem portion SPE1b may be about 40° to about 45°. The expression "angle between two elements", as used herein, denotes an acute angle between the two elements in the range of 0° to 90°.

The branch portions SPE1c may be spaced apart from one another by a predetermined distance. In an exemplary embodiment, a distance d between a second sub-branch portion SPE1c2 and a third sub-branch portion SPE1c3 may be about 4 μm to about 8 μm.

The first sub-edge portion SPE2a may extend from the first side of the body portion SPE1 substantially in the first direction $d_1$. The first sub-edge portion SPE2a may be spaced apart from the branch portions SPE1c. The first sub-edge portion SPE2a may be directly connected to the first side of the second stem portion SPE1b.

The first sub-edge portion SPE2a may be spaced apart from the first sub-shield electrode 180a1. The first sub-edge portion SPE2a may have the first region G1 and the second region G2, which differ from each other in terms of the shortest distance to the first sub-shield electrode 180a1. More specifically, the shortest distance to the first sub-shield electrode 180a1 in the first region G1, i.e., the distance l1, may be shorter than the shortest distance to the first sub-shield electrode 180a1 in the second region G2, i.e., the distance l2. The first sub-edge portion SPE2a may further have the fifth region G5, in which the shortest distance to the first sub-shield electrode 180a1, i.e., the distance l5, is shorter than the distance l2.

The second sub-edge portion SPE2b may extend from the second side of the body portion SPE1 substantially in the first direction $d_1$. The second sub-edge portion SPE2b may be spaced apart from the branch portions SPE1c. The second sub-edge portion SPE2b may be directly connected to the second side of the second stem portion SPE1b.

The second sub-edge portion SPE2b may be spaced apart from the second sub-shield electrode 180a2. The second sub-edge portion SPE2b may have the third region G3 and the fourth region G4, which differ from each other in terms of the shortest distance to the second sub-shield electrode 180a2. More specifically, the shortest distance to the second sub-shield electrode 180a2 in the third region G3, i.e., the distance l3, may be shorter than the shortest distance to the second sub-shield electrode 180a2 in the fourth region G4, i.e., the distance l4. The second sub-edge portion SPE2b may further have the sixth region G6, in which the shortest distance to the second sub-shield electrode 180a2, i.e., the distance l6, is shorter than the distance l4.

Consequently, the distance l1 and the distance l5 may differ from the distance l2. Accordingly, the intensity of a fringe field formed in connection with the relationship between the first sub-edge portion SPE2a and the first sub-shield electrode 180a1 may differ from the first region G1 to the second region G2 of the first sub-edge portion SPE2a. Also, the intensity of the fringe field formed in connection with the relationship between the first sub-edge portion SPE2a and the first sub-shield electrode 180a1 may differ from the fifth region G5 to the second region G2 of the first sub-edge portion SPE2a.

More specifically, the fringe field formed between each of the first region G1 and the fifth region G5 and the first sub-shield electrode 180a1 may be stronger than the fringe field formed between the second region G2 and the first sub-shield electrode 180a1.

The distance l3 and the distance l6 may differ from the distance l4. Accordingly, the intensity of a fringe field formed in connection with the relationship between the second sub-edge portion SPE2b and the second sub-shield electrode 180a2 may differ from the third region G3 to the fourth region G4 of the second sub-edge portion SPE2b. Also, the intensity of the fringe field formed in connection with the relationship between the second sub-edge portion SPE2b and the second sub-shield electrode 180a2 may differ from the sixth region G6 to the fourth region G4 of the second sub-edge portion SPE2b.

More specifically, the fringe field formed between each of the third region G3 and the sixth region G6 and the second sub-shield electrode 180a2 may be stronger than the fringe field formed between the fourth region G4 and the second sub-shield electrode 180a2.

That is, the pixel electrode PE may include a first high region H1 and a second high region H2, in which a side field formed in connection with the relationship between the pixel electrode PE and the shield electrode 180 is relatively strong. The pixel electrode PE may further include a low region L, which has a relatively weaker side field than the first high region H1 and the second high region H2. The low region L may be disposed between the first high region H1 and the second high region H2 with respect to the first direction $d_1$. A total area of the first and second high regions H1, H2 may be equal to the area of the lower region L1.

Since the pixel electrode PE includes regions where the intensity of a side field varies, the alignment angle of the liquid crystal molecules 31 may vary from one region to another region of the pixel electrode PE. Thus, side visibility may be improved. Also, gamma mixing may be realized at any given gray level.

Since the low region L is relatively distant from the second sub-shield electrode 180a2, the coupling between the first data line DL1 and the second data line DL2, which are adjacent to the pixel electrode PE, may be reduced. Accordingly, a vertical crosstalk phenomenon may be improved.

Figure 8:
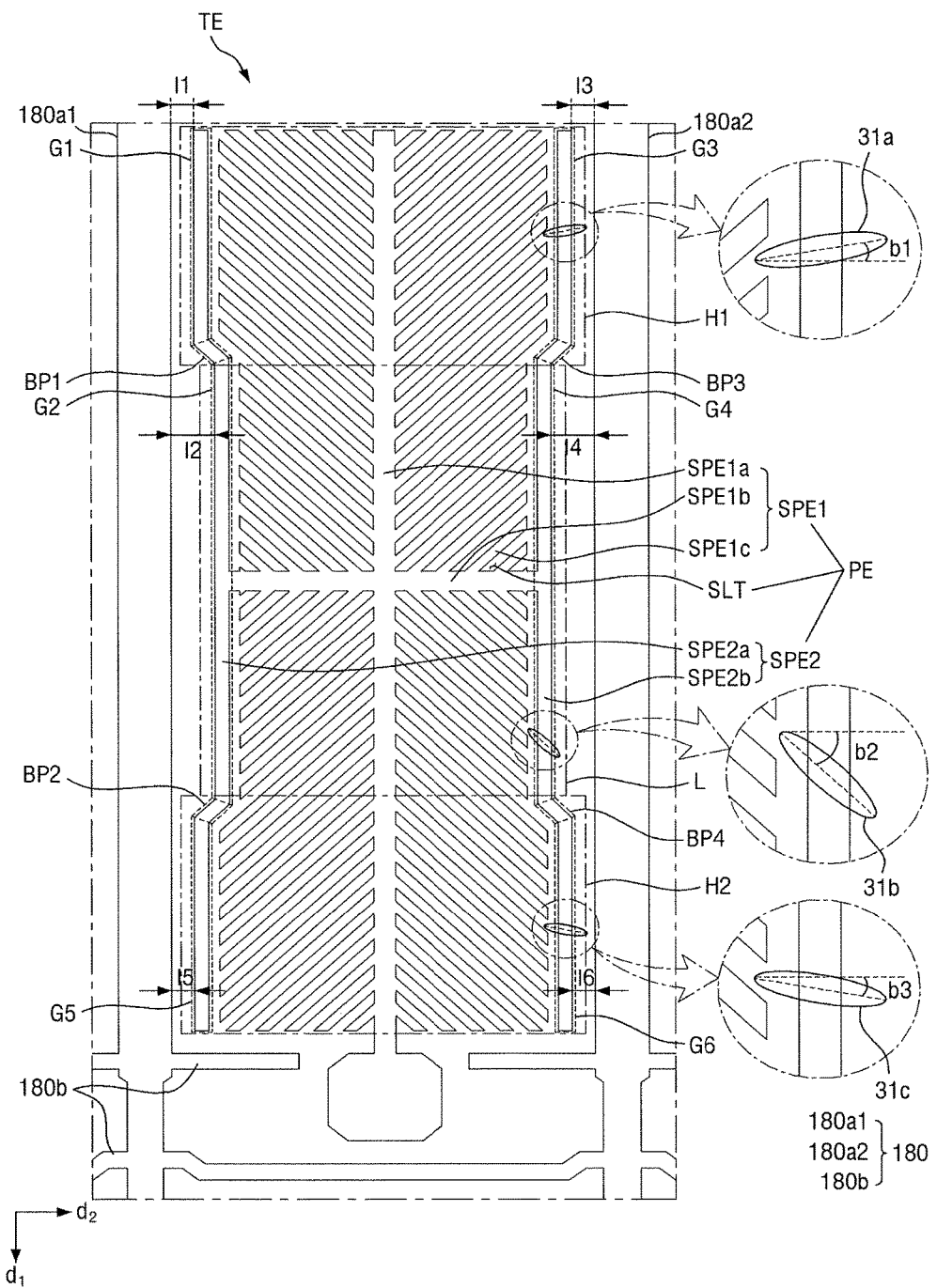
FIG. 8 illustrates a layout view showing the pretilt angle of liquid crystal molecules in a third region, a fourth region, and a sixth region, respectively, of FIG. 5.

The side field intensity of the pixel electrode PE will hereinafter be described with reference to FIGS. 6 through 8. FIG. 6 is a cross-sectional view taken along line II-II' of FIG. 5, and FIG. 7 is a cross-sectional view taken along line of FIG. 5. FIG. 8 is a layout view showing the pretilt angle of liquid crystal molecules 31 in the third region, the fourth region, and the sixth region, respectively, of FIG. 5.

For convenience, the LCD device according to the exemplary embodiment of FIG. 1 will hereinafter be described, focusing mainly on the second sub-edge portion SPE2b and the second sub-shield electrode 180a2.

Since the pixel electrode PE overlaps the common electrode CE in the direction perpendicular to the lower substrate 110, e.g., a third direction $d_3$, a fringe field may be formed. In an exemplary embodiment, since the second sub-shield electrode 180a2 is supplied with the same voltage as the common electrode CE, no fringe field may be formed in connection with the relationship between the second sub-shield electrode 180a2 and the common electrode CE.

The shortest distance to the second sub-shield electrode 180a2 in the third region G3 of the second sub-edge portion SPE2b, i.e., the distance l3, may be shorter than the shortest distance to the second sub-shield electrode 180a2 in the fourth region G4 of the second sub-edge portion SPE2b, i.e., the distance l4. Accordingly, an electric field formed between the third region G3 of the second sub-edge portion SPE2b in the first high region H1 and the second sub-shield electrode 180a2 may be stronger than an electric field formed between the fourth region G4 of the second sub-edge portion SPE2b in the low region L and the second sub-shield electrode 180a2.

That is, an electric field a1 formed in an area overlapping the third region G3 of the pixel electrode PE may be stronger than an electric field a2 formed in an area overlapping the fourth region G4 of the pixel electrode PE. Accordingly, the alignment angle of liquid crystal molecules 31 in the area overlapping the third region G3 may differ from the alignment angle of liquid crystal molecules 31 in the area overlapping the fourth region G4.

Referring to FIG. 8, the angle relative to the second direction $d_2$ at which the liquid crystal molecules 31 are pretilted may vary depending on which part of the pixel electrode PE the liquid crystal molecules 31 overlap.

More specifically, first liquid crystal molecules 31a in the area overlapping the third region G3 may be pretilted to have a first azimuthal angle b1. Second liquid crystal molecules 31b in the area overlapping the fourth region G4 may be pretilted to have a second azimuthal angle b2. The first azimuthal angle b1 may differ from the second azimuthal angle b2. More specifically, the first azimuthal angle b1 may be smaller than the second azimuthal angle b2.

Third liquid crystal molecules 31c in an area overlapping the sixth region G6 may be pretilted to have a third azimuthal angle b3. The third azimuthal angle b3 may differ from the second azimuthal angle b2. More specifically, the third azimuthal angle b3 may be smaller than the second azimuthal angle b2. In an exemplary embodiment, the first azimuthal angle b1 and the third azimuthal angle b3 may have a same absolute value relative to the second direction $d_2$, but in an opposite direction, but the present disclosure is not limited thereto. Alternatively, by making the distance l3 and the distance l6 differ from each other, the first azimuthal angle b1 and the third azimuthal angle b3 may be made to differ, e.g., in magnitude, from each other.

That is, the pixel electrode PE may have, on the sides thereof, at least two regions where the liquid crystal molecules 31 are pretilted to have different azimuthal angles. Accordingly, gamma mixing may be realized at any given gray level, and as a result, side visibility may be improved.

Figure 9:
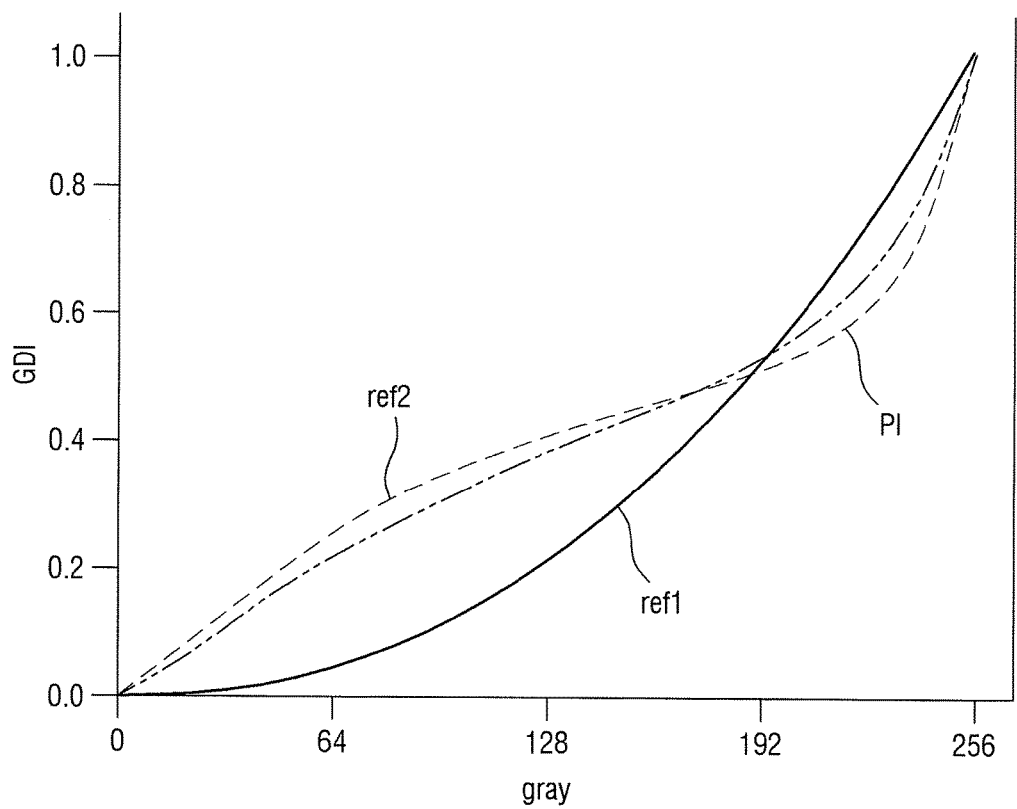
FIG. 9 illustrates a graph showing an improvement in the side visibility of an LCD device according to the exemplary embodiment of FIG. 1.

FIG. 9 is a graph showing an improvement in the side visibility of an LCD device according to the exemplary embodiment of FIG. 1. Referring to FIG. 9, "PI" represents the side visibility of the LCD device according to the exemplary embodiment of FIG. 1, "ref1" represents the front visibility of an LCD device, and "ref2" represents the side visibility of an LCD device according to a comparative example.

As illustrated in FIG. 9, the side visibility PI of the LCD device according to the exemplary embodiment of FIG. 1 is closer to the front visibility ref1 than the side visibility ref2 of the LCD device according to the comparative example. More specifically, the gamma distortion index (GDI) of the LCD device according to the exemplary embodiment of FIG. 1 is about 0.024 lower than the GDI of the LCD device according to the comparative example.

Figure 10:
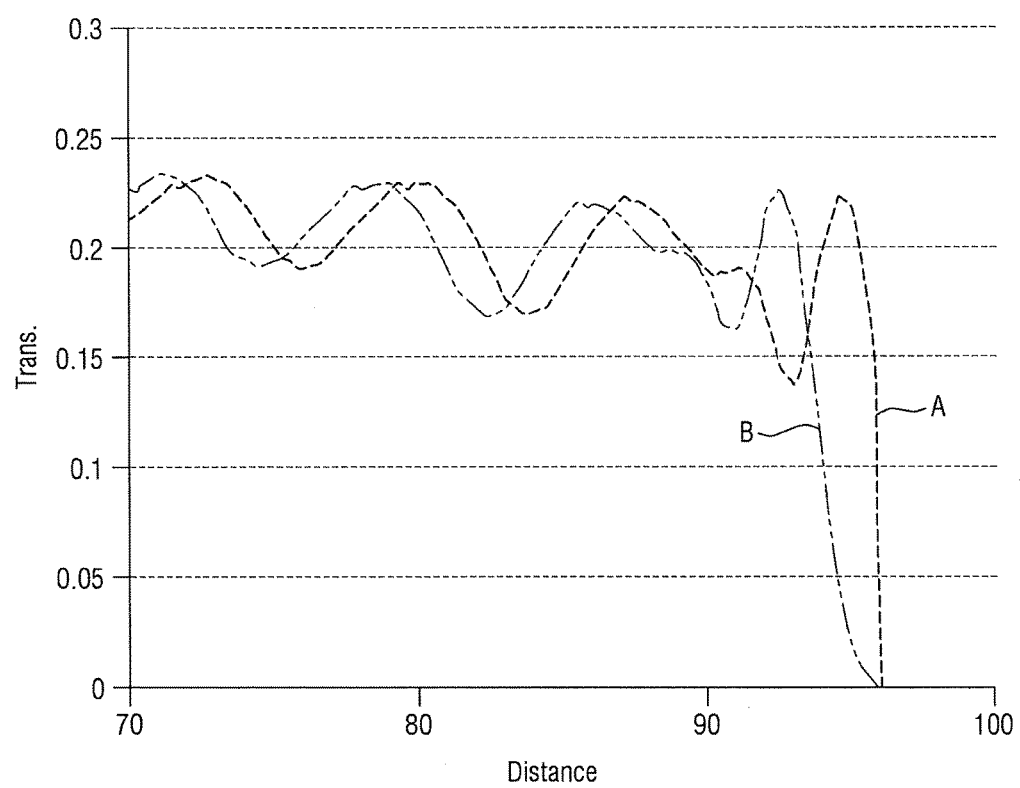
FIG. 10 illustrates a graph showing a gamma mixing effect provided by the LCD device according to the exemplary embodiment of FIG. 1.

FIG. 10 is a graph showing a gamma mixing effect provided by the LCD device according to the exemplary embodiment of FIG. 1. Referring to FIG. 10, "A" represents the transmittance in the first high region H1 or the second high region H2 of FIG. 5, "B" represents the transmittance in the low region L of FIG. 5, and the horizontal axis represents the distance to the first stem portion SPE1a of FIG. 5.

As illustrated in FIG. 10, the longer the distance to the first stem portion SPE1a, i.e., the closer to the side of the pixel electrode PE of FIG. 5, the greater the difference between the transmittance "A" in the first high region H1 or the second high region H2 and the transmittance "B" in the low region L. Accordingly, gamma mixing may be realized at any given gray level even within a single pixel electrode PE.

FIGS. 11 through 15 are layout views of modified examples of the pixel electrode of FIG. 1, i.e., pixel electrodes PEa through PEe. The pixel electrodes PEa through PEe will hereinafter be described, focusing mainly on differences with the pixel electrode PE that has been described above with reference to FIGS. 1 and 5. For convenience, the same elements are indicated by the same reference numerals throughout FIGS. 1, 5, and 11 through 15 regardless of the quantity thereof. It is assumed that each of the pixel electrodes PEa through PEe includes a first sub-edge portion SPE2a that is symmetrical with a second sub-edge portion SPE2b with respect to a first stem portion SPE1a.

Figure 11:
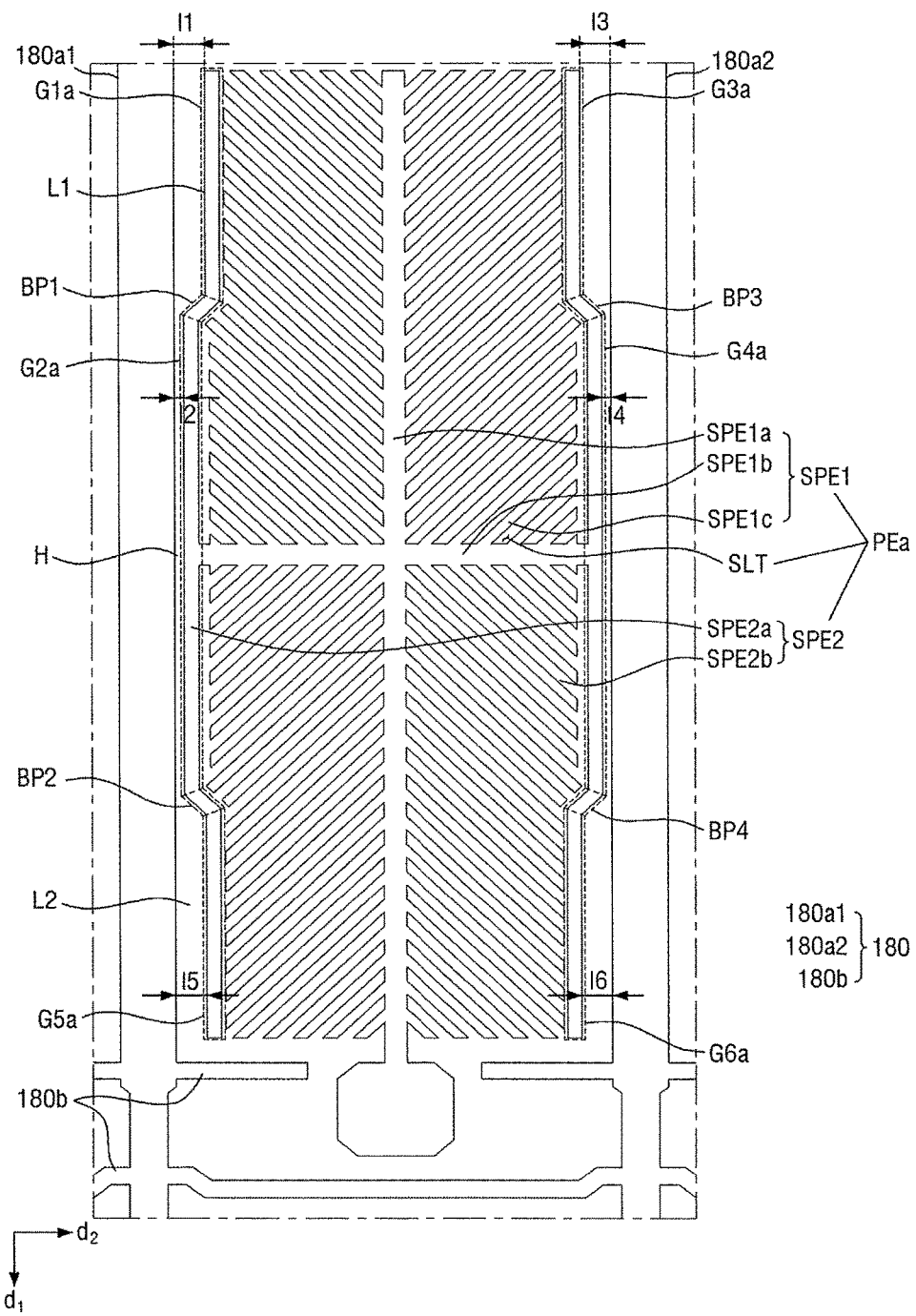
FIGS. 11 through 15 illustrate layout views of modified examples of a pixel electrode of FIG. 1.

Referring to FIG. 11, the pixel electrode PEa may include a first sub-edge portion SPE2a, and the first sub-edge portion SPE2a may have a first region G1a and a second region G2a, which differ from each other in terms of the shortest distance to a first sub-shield electrode 180a1. More specifically, the shortest distance to the first sub-shield electrode 180a1 in the first region G1a, i.e., a distance l1, may be longer than the shortest distance to the first sub-shield electrode 180a1 in the second region G2a, i.e., a distance l2.

The first sub-edge portion SPE2a may further have a fifth region G5a in which the shortest distance to the first sub-shield electrode 180a1, i.e., a distance l5, is longer than the distance l2 of the second region G2a. The first sub-edge portion SPE2a may further have one or more bent portions BP1 and BP2.

Accordingly, the intensity of a fringe field formed in connection with the relationship between the first sub-edge portion SPE2a and the first sub-shield electrode 180a1 may differ from the first region G1a to the second region G2a. Also, the intensity of the fringe field formed in connection with the relationship between the first sub-edge portion SPE2a and the first sub-shield electrode 180a1 may differ from the fifth region G5a to the second region G2a.

More specifically, the fringe field formed between the first sub-shield electrode 180a1 and the first region G1a or the fifth region G5a may be weaker than the fringe field formed between the second region G2a and the first sub-shield electrode 180a1. Thus, a first low region L1 and a second low region L2 are separated along the second direction $d_2$ by a high region H. An area of the first and second low regions together may equal that of the high region.

Accordingly, since the pixel electrode PEa has regions where the intensity of a side field varies, the alignment angle of liquid crystal molecules may vary from one region to another region of the pixel electrode PEa. Thus, side visibility may be improved. Also, gamma mixing may be realized at any given gray level.

Figure 12:
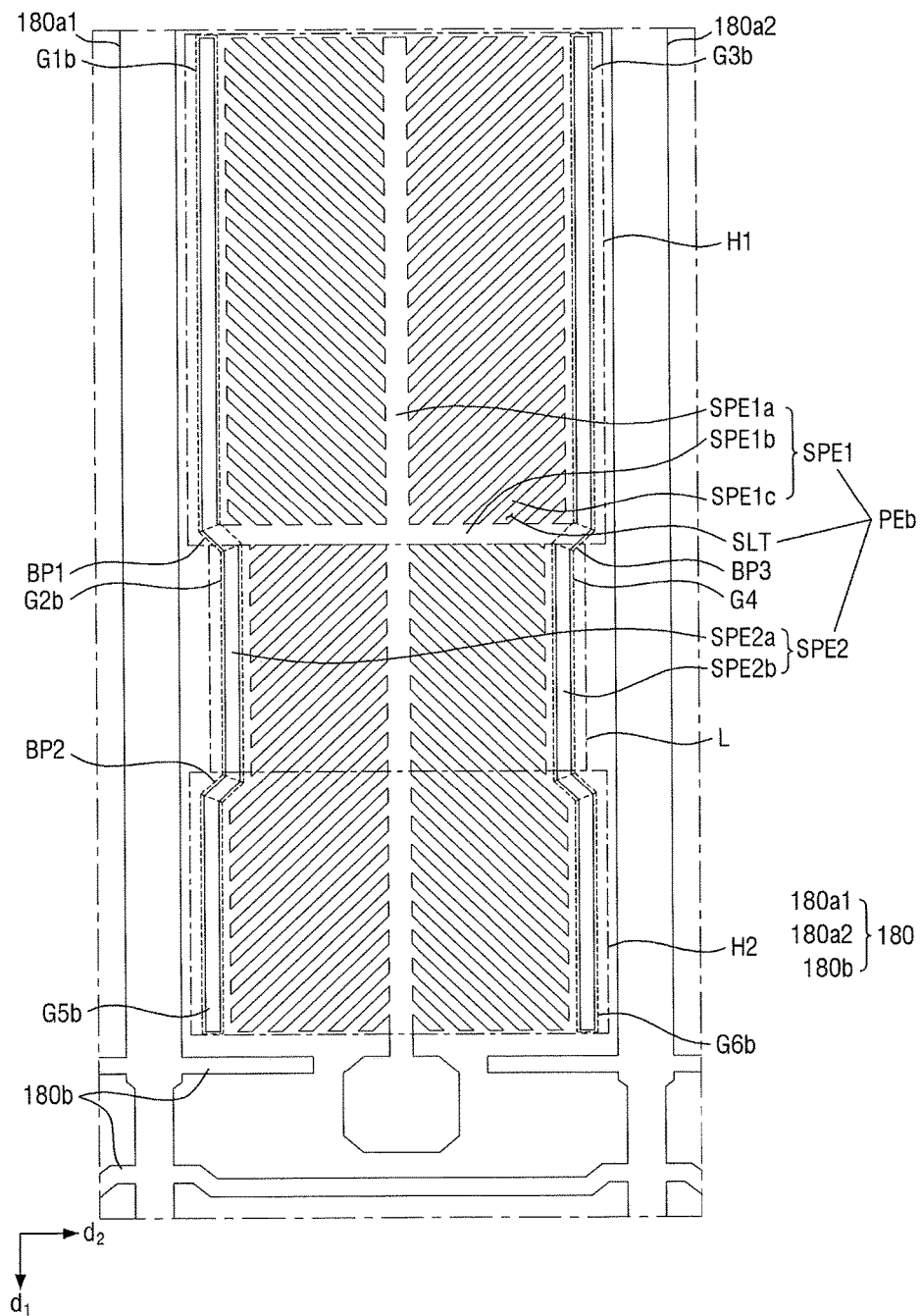

Referring to FIG. 12, the pixel electrode PEa may include a first sub-edge portion SPE2a, and the first sub-edge portion SPE2a may have a first region G1b and a second region G2b, which differ from each other in terms of the shortest distance to a first sub-shield electrode 180a1. More specifically, the shortest distance to the first sub-shield electrode 180a1 in the first region G1b, i.e., a distance l1, may be shorter than the shortest distance to the first sub-shield electrode 180a1 in the second region G2b, i.e., a distance l2.

The first sub-edge portion SPE2a may further have a fifth region G5b in which the shortest distance to the first sub-shield electrode 180a1. i.e., a distance l5, is shorter than the distance l2 of the second region G2b. The first sub-edge portion SPE2a may further have one or more bent portions BP1 and BP2.

In FIG. 12, the area of a first high region H1 of the pixel electrode PEb may be larger than the area of a low region L of the pixel electrode PEb. More specifically, the low region L may be provided only on a lower side of a second stem portion SPE1b and the low region L may have a same area as the second high region H2, but the present disclosure is not limited thereto. That is, alternatively, the low region L may be provided only on an upper side of the second stem portion SPE1b, in which case, the area of a second high region H2 may be larger than the area of the low region L.

Figure 13:
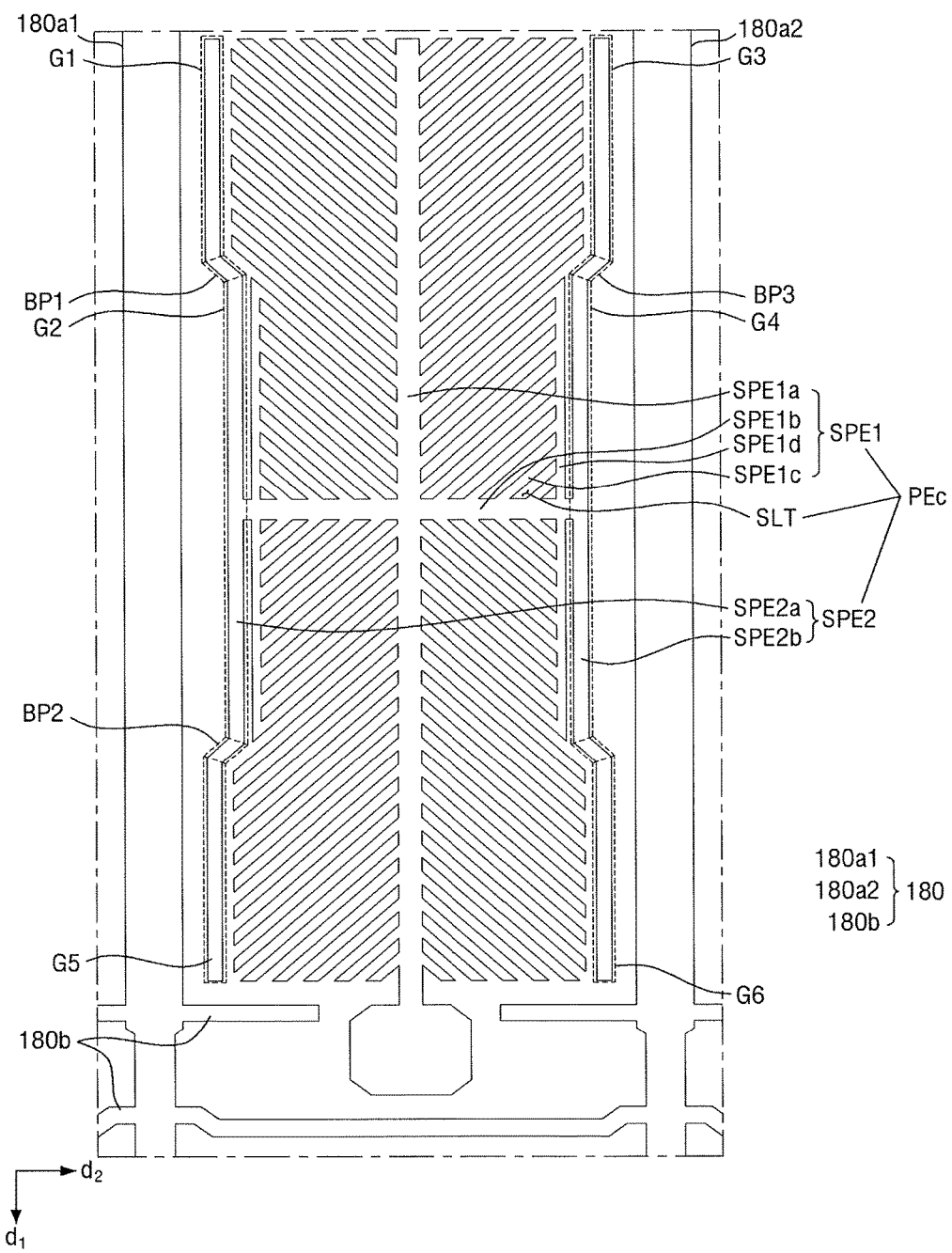

Referring to FIG. 13, a body portion SPE1 of the pixel electrode PEc may further include a boundary portion SPE1d. The boundary portion SPE1d may extend in a first direction $d_1$. In an exemplary embodiment, the boundary portion SPE1d may connect branch portions SPE1c in a low region L. That is, the branch portions SPE1c in the low region L may be formed in a closed shape. In this case, an area for improving luminance at a high gray level may be widened, and thus, a color shift phenomenon of the pixel electrode PEc may be improved.

Figure 14:
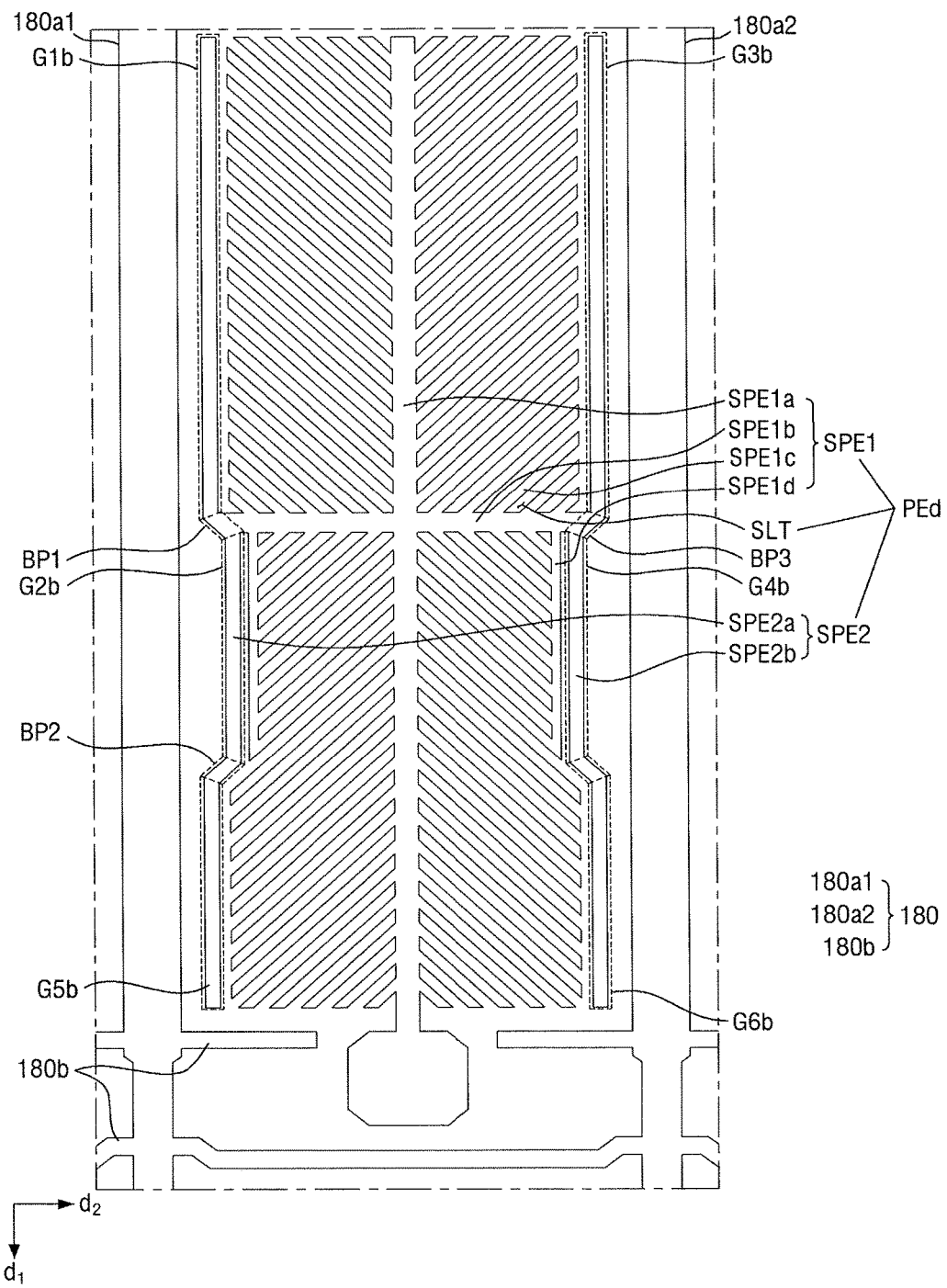

Referring to FIG. 14, the area of a first high region H1 of the pixel electrode PEd may be larger than the area of a low region L of the pixel electrode PEd. More specifically, the low region L may be provided only on a lower side of a second stem portion SPE1b. The ends of branch portions SPE1c in the low region L may be connected by a boundary portion SPE1d.

However, the present disclosure is not limited to the example illustrated in FIG. 14. That is, alternatively, the low region L may be provided only on an upper side of the second stem portion SPE1b, in which case, the area of a second high region H2 may be larger than the area of the low region L.

Figure 15:
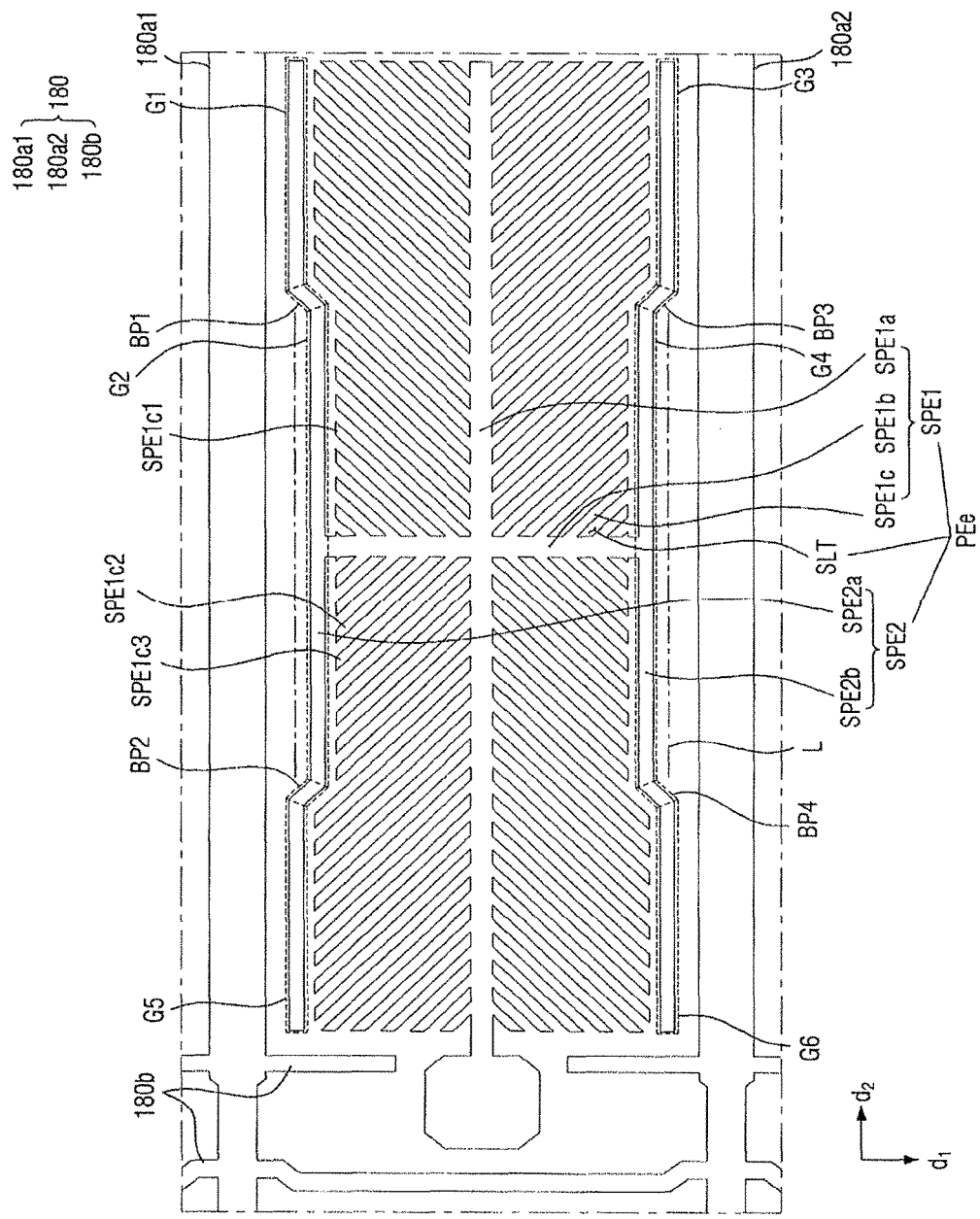

Referring to FIG. 15, the pixel electrode PEe may extend in a second direction $d_2$. In this case, the pixel unit PX and a neighboring pixel unit PX in a first direction $d_1$ may both be connected to a first data line DL1. Accordingly, the number of data lines required and the number of data drivers connected to the data lines may both be reduced.

Figure 16:
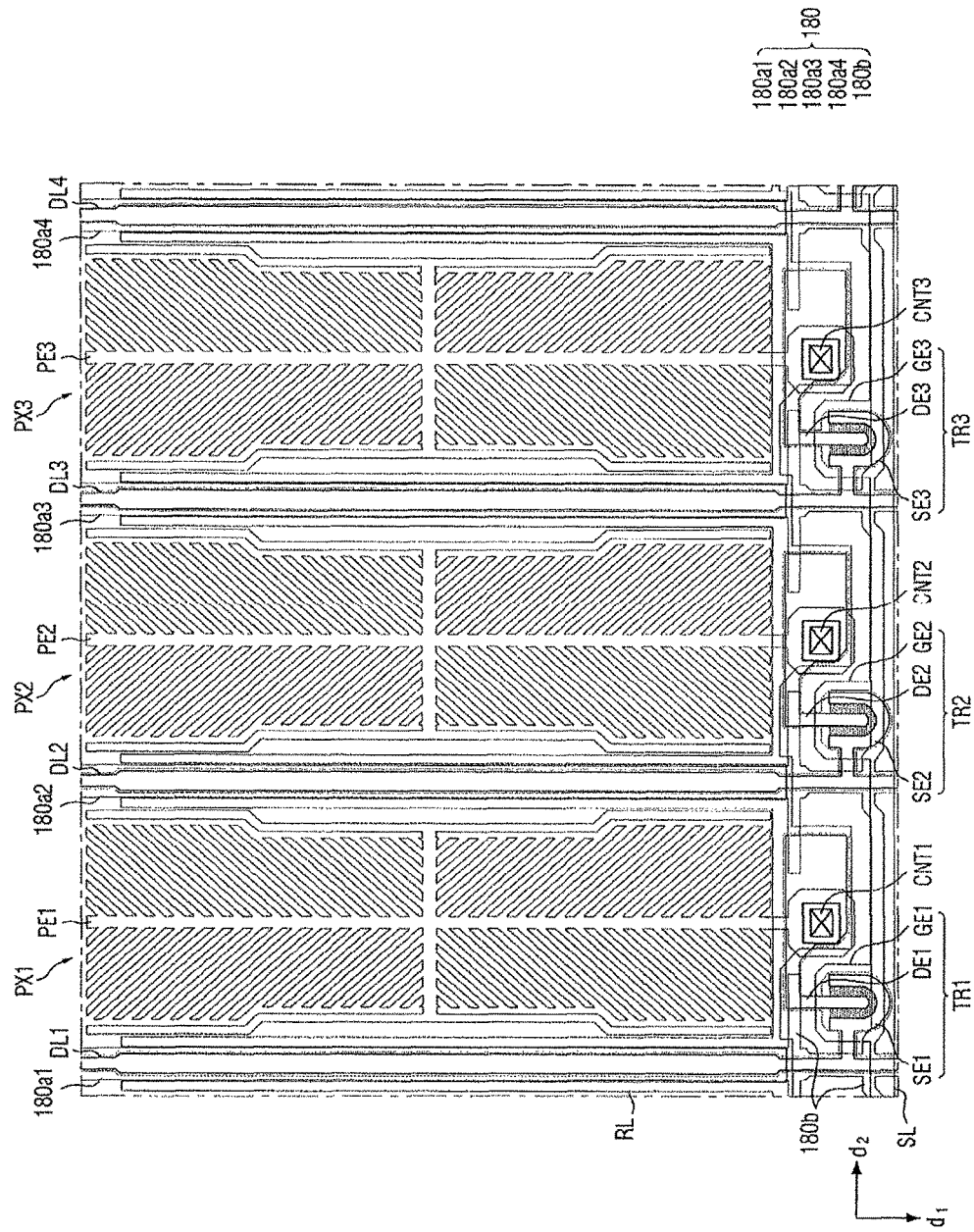
FIG. 16 illustrates a layout view of first through third pixel units of the LCD device according to the exemplary embodiment of FIG. 1.

FIG. 16 is a layout view illustrating first through third pixel units of the LCD device according to the exemplary embodiment of FIG. 1.

Referring to FIG. 16, a first pixel unit PX1 may be electrically connected to the first data line DL1 and the scan line SL. The first pixel unit PX1 may include a first switching device TR1 and a first pixel electrode PE1. The first switching device TR1 may perform a switching operation according to the gate signal provided from the scan line SL via a first gate electrode GE1. Accordingly, the data signal provided from the first data line DL1 via a first source electrode SE1 may be provided to the first pixel unit PE1 via a first drain electrode DE1 and a first contact hole CNT1.

A second pixel unit PX2 may be electrically connected to the second data line DL2 and the scan line SL. The second pixel unit PX2 may include a second switching device TR2 and a second pixel electrode PE2. The second switching device TR2 may perform a switching operation according to the gate signal provided from the scan line SL via a second gate electrode GE2. Accordingly, a data signal provided from the second data line DL2 via a second source electrode SE2 may be provided to the second pixel unit PE2 via a second drain electrode DE2 and a second contact hole CNT2.

A third pixel unit PX3 may be electrically connected to a third data line DL3 and the scan line SL. The third pixel unit PX3 may include a third switching device TR3 and a third pixel electrode PE3. The third switching device TR3 may perform a switching operation according to the gate signal provided from the scan line SL via a third gate electrode GE3. Accordingly, a data signal provided from the third data line DL3 via a third source electrode SE3 may be provided to the third pixel unit PE3 via a third drain electrode DE3 and a third contact hole CNT3.

In an exemplary embodiment, the first pixel unit PX1, the second pixel unit PX2, and the third pixel unit PX3 may display different colors. For example, the first pixel unit PX1 may display a red color, the second pixel unit PX2 may display a green color, and the third pixel unit PX3 may display a blue color.

The first pixel unit PX1, the second pixel unit PX2, and the third pixel unit PX3 may have the same shape. The first pixel electrode PEE the second pixel electrode PE2, and the third pixel electrode PE3 may have the same shape as the pixel electrode PE of FIG. 5, and thus, a detailed description thereof will be omitted. That is, the LCD device according to the exemplary embodiment of FIG. 1 may include the first pixel unit PX1, the second pixel unit PX2, and the third pixel unit PX3, which display different colors, and the first pixel unit PX1, the second pixel unit PX2, and the third pixel unit PX3 may include the first pixel electrode PE1, the second pixel electrode PE2, and the third pixel electrode PE3, respectively, which have the same shape.

Figure 17:
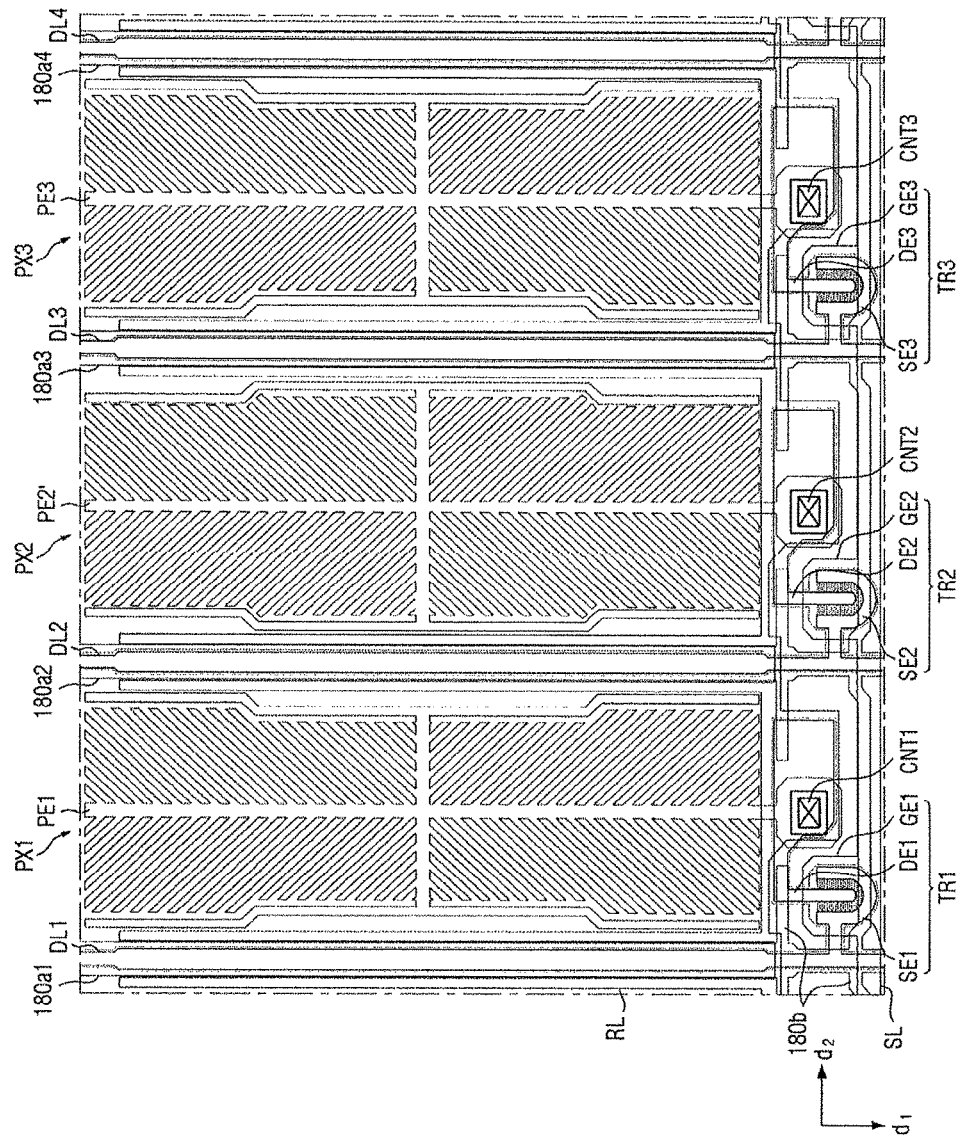
FIG. 17 illustrates a layout view of first through third pixel units of an LCD device according to another exemplary embodiment of the present disclosure.

FIG. 17 is a layout view illustrating first through third pixel units of an LCD device according to another exemplary embodiment of the present disclosure. The LCD device according to FIG. 17 will hereinafter be described, focusing mainly on differences with the LCD device according to the exemplary embodiment of FIG. 16.

Referring to FIG. 17, the first pixel electrode PE1 and the third pixel electrode PE3 may have the same shape. On the other hand, a second pixel electrode PE2' may have a different shape from the first pixel electrode PE1 and the third pixel electrode PE3. More specifically, the first pixel electrode PE1 and the third pixel electrode PE3 may have the same shape as the pixel electrode PE of FIG. 5, and the second pixel electrode PE' may have the same shape as the pixel electrode PEa of FIG. 11.

That is, the first pixel electrode PE1, the second pixel electrode PE2', and the third pixel electrode PE3, which display different colors, may have different shapes, and thus, image sticking or texture may be improved.

However, pixel electrodes having different shapes may not necessarily be alternately arranged, and the interval at which the pixel electrodes having different shapes are arranged may be appropriately adjusted.

By way of summation and review, one or more embodiments of the present disclosure provide a liquid crystal display (LCD) device capable of improving side visibility in a pixel configuration having one switching device and one contact hole. One or more embodiments may effectively control the orientation of liquid crystal molecules at a low gray level. One or more embodiments provide an LCD that has liquid crystals molecules having different pretilt angles in different regions thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A liquid crystal display (LCD) device, comprising:
a first substrate;
a first pixel electrode on the first substrate and including a first body portion, a first sub-edge portion on a first side of the first body portion, and a second sub-edge portion on a second side of the first body portion; and
a shield electrode including a first sub-shield electrode on a first side of the first pixel electrode, and a second sub-shield electrode on a second side of the first pixel electrode,
wherein:
the first body portion includes a first stem portion, which extends in a first direction, a second stem portion, which extends in a second direction that intersects the first direction, and a plurality of branch portions, which extend from at least one of the first stem portion and the second stem portion;
the first sub-edge portion has a first region and a second region having different shortest distances to the first sub-shield electrode;
the second sub-edge portion has a third region and a fourth region having different shortest distances to the second sub-shield electrode; and the first body portion, the first sub-edge portion, the second sub-edge portion, the first sub-shield electrode, and the second sub-shield electrode are on the same layer.

2. The LCD device as claimed in claim 1, wherein the first sub-edge portion and the second sub-edge portion do not directly contact the branch portions.

3. The LCD device as claimed in claim 1, wherein:
the first sub-edge portion directly contacts a first side of the second stem portion; and
the second sub-edge portion directly contacts a second side of the second stem portion.

4. The LCD device as claimed in claim 1, wherein the first sub-edge portion is symmetrical with the second sub-edge portion with respect to the first stem portion.

5. The LCD device as claimed in claim 1, wherein:
a shortest distance to the first sub-shield electrode in the second region is longer than a shortest distance to the first sub-shield electrode in the first region; and
a shortest distance to the second sub-shield electrode in the fourth region is longer than a shortest distance to the second sub-shield electrode in the third region.

6. The LCD device as claimed in claim 5, wherein:
the first sub-edge portion has a fifth region in which a shortest distance to the first sub-shield electrode is shorter than the shortest distance to the first sub-shield electrode in the second region; and
the second sub-edge portion has a sixth region in which a shortest distance to the second sub-shield electrode is shorter than the shortest distance to the first sub-shield electrode in the fourth region.

7. The LCD device as claimed in claim 6, wherein:
the second region is between the first region and the fifth region along the first direction; and
the fourth region is between the third region and the sixth region along the first direction.

8. The LCD device as claimed in claim 1, further comprising:
a second substrate facing the first substrate;
a common electrode on the second substrate and overlapping the first pixel electrode; and
a liquid crystal layer including a plurality of liquid crystal molecules between the first substrate and the second substrate,
wherein:
the liquid crystal molecules include first liquid crystal molecules in an area overlapping the first region and second liquid crystal molecules in an area overlapping the second region; and
the first liquid crystal molecules are pretilted to have a different azimuthal angle from the second liquid crystal molecules.

9. The LCD device as claimed in claim 1, wherein:
the branch portions include first sub-branch portions between the second region and the first stem portion along the second direction, and second sub-branch portions between the fourth region and the first stem portion along the second direction;
ends of the first sub-branch portions are connected to one another; and
ends of the second sub-branch portions are connected to one another.

10. The LCD device as claimed in claim 1, further comprising:
a second pixel electrode on the first substrate and neighboring the first pixel electrode,
wherein:

the second pixel electrode includes a second body portion having a third stem portion extending in the first direction, and a third sub-edge portion between a first side of the second body portion and the second sub-shield electrode; and
the third sub-edge portion has a seventh region and an eighth region having different shortest distances to the second sub-shield electrode.

11. The LCD device as claimed in claim 10, wherein a shortest distance to the second sub-shield electrode in the seventh region is longer than a shortest distance to the second sub-shield electrode in the eighth region.

12. The LCD device as claimed in claim 1, wherein the shield electrode includes a portion that extends along the second direction.

13. An LCD device, comprising:
a first substrate;
a first pixel electrode on the first substrate and including a first body portion and a first sub-edge portion on a first side of the first body portion; and
a shield electrode extending from a first side of the first sub-edge portion in a first direction,
wherein:
the first body portion includes a first stem portion extending in the first direction, a second stem portion extending in a second direction that intersects the first direction, and a plurality of branch portions extending from at least one of the first stem portion and the second stem portion;
the first sub-edge portion is spaced apart from the branch portions and has a bent portion; and
the first body portion, the first sub-edge portion, and the shield electrode are on the same layer.

14. The LCD device as claimed in claim 13, wherein the first sub-edge portion has a first region and a second region having different shortest distances to the shield electrode.

15. The LCD device as claimed in claim 14, wherein:
a shortest distance to the shield electrode in the first region is shorter than a shortest distance to the shield electrode in the second region;
the first sub-edge portion further has a third region in which the shortest distance to the shield electrode is shorter than the shortest distance to the shield electrode in the second region; and
the second region is between the first region and the third region with respect to the first direction.

16. The LCD device as claimed in claim 14, further comprising:
a second substrate facing the first substrate; and
a liquid crystal layer including a plurality of liquid crystal molecules between the first substrate and the second substrate,
wherein:
the liquid crystal molecules include first liquid crystal molecules in an area overlapping the first region and second liquid crystal molecules in an area overlapping the second region; and
the first liquid crystal molecules are pretilted to have a different azimuthal angle from the second liquid crystal molecules.

17. The LCD device as claimed in claim 13, wherein the first sub-edge portion has a third region and a fourth region having different shortest distances to the first stem portion.

18. The LCD device as claimed in claim 13, further comprising:
a second sub-edge portion on a second side of the first body portion, wherein the second sub-edge portion is spaced apart from the branch portions and has a bent portion.

19. The LCD device as claimed in claim 18, wherein the first sub-edge portion is symmetrical with the second sub-edge portion with respect to the first stem portion.

20. The LCD device as claimed in claim 18, further comprising:
 a second pixel electrode on the same layer as the first pixel electrode and neighboring the first pixel electrode, wherein:
 the second pixel electrode includes a second body portion having a third stem portion extending in the first direction and a third sub-edge portion between the second body portion and the shield electrode; and
 the third sub-edge portion has a bent portion.

21. The LCD device as claimed in claim 20, wherein the third sub-edge portion has the same shape as the first sub-edge portion.

22. The LCD device as claimed in claim 20, wherein the first sub-edge portion includes a first region extending in the first direction and a second region extending in the first direction spaced apart from the first region along the second direction, and the bent portion connects the first and second regions.

23. The LCD device as claimed in claim 22, wherein the first sub-edge portion includes a third region extending in the first direction spaced apart from the second region in the second direction and another bent portion that connects the second and third regions.

24. The LCD device as claimed in claim 23, wherein the first region and the third region are aligned in the second direction.

25. The LCD device as claimed in claim 23, wherein an area of the first and third regions equals an area of the second region.

26. The LCD device as claimed in claim 23, wherein an area of the first and third regions is greater than an area of the second region.

27. The LCD device as claimed in claim 13, wherein the shield electrode includes a portion that extends along the second direction.

* * * * *